(12) United States Patent
Bhide et al.

(10) Patent No.: US 11,475,331 B2
(45) Date of Patent: Oct. 18, 2022

(54) BIAS SOURCE IDENTIFICATION AND DE-BIASING OF A DATASET

(71) Applicant: International Business Machines Corporation, Armonk, NY (US)

(72) Inventors: Manish Anand Bhide, Hyderabad (IN); Pranay Kumar Lohia, Bhagalpur (IN); Diptikalyan Saha, Bangalore (IN); Madhavi Katari, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 16/911,642

(22) Filed: Jun. 25, 2020

(65) Prior Publication Data

US 2021/0406712 A1    Dec. 30, 2021

(51) Int. Cl.
*G06N 5/04*       (2006.01)
*G06N 20/00*     (2019.01)
*G06F 16/23*     (2019.01)

(52) U.S. Cl.
CPC ........... *G06N 5/04* (2013.01); *G06F 16/2379* (2019.01); *G06N 20/00* (2019.01)

(58) Field of Classification Search
CPC combination set(s) only.
See application file for complete search history.

(56) References Cited

U.S. PATENT DOCUMENTS

| | | | |
|---|---|---|---|
| 7,949,639 B2 | 5/2011 | Hunt et al. | |
| 8,150,849 B2 | 4/2012 | Chaudhury et al. | |
| 9,430,741 B2 | 8/2016 | Baughman et al. | |
| 9,526,421 B2 | 12/2016 | Papadopoulos et al. | |
| 10,304,003 B2 | 5/2019 | Baughman et al. | |
| 10,990,901 B2 | 4/2021 | Deo et al. | |
| 2008/0288889 A1* | 11/2008 | Hunt | G06Q 30/02 715/810 |

(Continued)

FOREIGN PATENT DOCUMENTS

WO    WO2017/149443 A1    9/2017

OTHER PUBLICATIONS

List of IBM Patents or Patent Applications Treated as Related, Jun. 25, 2020, 2 pages.

(Continued)

*Primary Examiner* — El Hadji M Sall
(74) *Attorney, Agent, or Firm* — Stephen J. Walder, Jr.; Alexander G. Jochym

(57) ABSTRACT

A source of bias identification (SoBI) tool is provided that identifies sources of bias in a dataset. A bias detection operation is performed on results of a computer model, based on an input dataset, to generate groupings of values for a protected attribute corresponding to a detected bias in the operation of the computer model. The SoBI tool generates a plurality of sub-groups for each grouping of values. Each sub-group comprises an individual value, or a sub-range, for the protected attribute. The SoBI tool analyzes each of the sub-groups in the plurality of sub-groups, based on at least one source of bias identification criterion, to identify one or more sources of bias in the input dataset. The SoBI tool outputs a bias notification to an authorized computing device specifying the one or more sources of bias in the input dataset.

20 Claims, 9 Drawing Sheets

(56) References Cited

U.S. PATENT DOCUMENTS

| | | | |
|---|---|---|---|
| 2008/0319829 A1* | 12/2008 | Hunt | G06Q 30/0201 |
| | | | 705/7.29 |
| 2011/0125734 A1 | 5/2011 | Duboue et al. | |
| 2014/0021365 A1* | 1/2014 | Oda | G01T 1/17 |
| | | | 250/336.1 |
| 2015/0221088 A1* | 8/2015 | Satish | G16Z 99/00 |
| | | | 382/134 |
| 2015/0310116 A1 | 10/2015 | Fan | |
| 2015/0338506 A1* | 11/2015 | Yukumatsu | G01S 7/35 |
| | | | 342/27 |
| 2016/0224666 A1 | 8/2016 | Horvitz et al. | |
| 2016/0239740 A1 | 8/2016 | Baughman et al. | |
| 2017/0330058 A1 | 11/2017 | Silberman et al. | |
| 2018/0296102 A1* | 10/2018 | Satish | G06K 19/07749 |
| 2018/0341637 A1 | 11/2018 | Gaur et al. | |
| 2019/0188605 A1 | 6/2019 | Zavesky et al. | |
| 2019/0195941 A1* | 6/2019 | Winer | G01D 5/2448 |
| 2020/0082299 A1 | 3/2020 | Vasconcelos et al. | |
| 2020/0285999 A1 | 9/2020 | McGovern et al. | |
| 2020/0380398 A1 | 12/2020 | Weider et al. | |
| 2021/0049503 A1 | 2/2021 | Nourian et al. | |
| 2021/0174222 A1* | 6/2021 | Dodwell | G06F 16/285 |

OTHER PUBLICATIONS

"AI Fairness 360 Open Source Toolkit", IBM Corporation, accessed online Jun. 1, 2020, 3 pages.

"Detecting and mitigating age bias on credit decisions", Project Jupyter, accessed online Jun. 1, 2020, 4 pages.

Anonymous, "Cognitive Detector of Common Issues in IoT Devices (Hardware and Software)", IP.com, IP.com No. IPCOM000249187D, Feb. 9, 2017, 6 pages.

Anonymous, "System and Method for Locating Source of Bias", IP.com, IP.com No. IPCOM000255888D, Oct. 19, 2018, 6 pages.

Bosch, Nigel et al., "Accuracy vs. Availability Heuristic in Multimodal Affect Detection in the Wild", Proceedings of the 2015 ACM on International Conference on Multimodal Interaction (ICMI '15), Nov. 9-13, 2015, 9 pages.

Gehlbach, Hunter, "Meta-bias: A practical theory of motivated thinking", Education Psychology Review, Nov. 2018, 32 pages.

High, Rob, "The Era of Cognitive Systems: An Inside Look at IBM Watson and How it Works", IBM Corporation, Redbooks, Dec. 12, 2012, 16 pages.

Recasens, Marta et al., "Linguistic Models for Analyzing and Detecting Biased Language", Proceedings of the 51st Annual Meeting of the Association for Computational Linguistics, Aug. 4-9, 2013, 10 pages.

Ribeiro, Marco T. et al., ""Why Shoud I Trust You?" Explaining the Predictions of Any Classifier", Proceedings of the 22nd ACM SIGKDD International Conference on Knowledge Discovery and Data Mining, ACM 2016, arXiv:1602.04938v3 [cs.LG] Aug. 9, 2016, 10 pages.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, 14 pages.

Herzig, Livnat et al., "An Annotation Scheme for Automated Bias Detection in Wikipedia", 2011 Linguistic Annotation Workshop, vol. 2011, pp. 47-55, Jun. 2011.

Adebayo, Julius A., "FairML: ToolBox for Diagnosing Bias in Predictive Modeling", Massachusetts Institute of Technology Library Archives, Jun. 2016, pp. 1-99.

Angell, Rico et al., "Themis: Automatically Testing Software for Discrimination", ESEC/FSE 2018: Proceedings of the 2018 26th ACM Joint Meeting on European Software Engineering Conference and Symposium on the Foundations of Software Engineering, vol. 26, Nov. 2018, pp. 871-875.

Bolukbasi, Tolga et al., "Man is to Computer Programmer as Woman is to Homemaker? Debiasing Word Embeddings", arXiv:1607.06520v1, Jul. 21, 2016, pp. 1-25.

Decook, R., "6:1: Statistical Significance", University of Iowa, Retrieved from https://homepage.stat.uiowa.edu/~rdecook/stat1010/notes/Section_6.1_statistical_significance.pdf, Sep. 28, 2016, 14 pages.

Jiang, Heinrich et al., "Identifying and Correcting Label Bias in Machine Learning", arXiv:1901.04966v1, Jan. 15, 2019, pp. 1-16.

* cited by examiner

| age | age_cat | other_payment_plans | housing | existing_credits | job | num_dependents | own_telephone | foreign_worker | class |
|---|---|---|---|---|---|---|---|---|---|
| 67 | old | none | own | 2 | skilled | 1 | yes | yes | good |
| 22 | young | none | own | 1 | skilled | 1 | none | yes | bad |
| 49 | old | none | own | 1 | unskilled resident | 2 | none | yes | good |
| 45 | old | none | for free | 1 | skilled | 2 | none | yes | good |
| 53 | old | none | for free | 2 | skilled | 2 | none | yes | bad |

210

220

{'data_filename': 'german_categorical.csv',
'class_label': 'class',
'protected_attributes': ['age'],
'threshold' : 0.8,
'favorable_class': ['good'],
'majority': {'age': '>25'},
'minority': {'age' : '<=25'},
'source_bias': True,
'verbose': True}

*FIG. 2*

```
({'biasValue': 0.795,
  'valClassFavorTypeMinority': 110,
  'valTypeMinority': 190,
  'valClassFavorTypeMajority': 590,
  'valTypeMajority': 810,
  'majority': '[26,75]',
  'minority': '[19,25]',
  'protectedAttribute': 'age',
  'threshold': '0.8',
  'favourableClass': 'good',
  'class': 'class',                                                        } 410
  'description': 'Only 57.89% of the group 19<=age<=25 received the outcome class = good, compared to 72.84% of the
group 26<=age<=75. Hence, the data exhibits group discrimination or bias against 19<=age<=25. The maximum contributin
g factor to the bias amongst rows with values 26<=age<=75 was from rows with age in the ranges [35,43] and [44,52] as
77.35% and 78.69% of such rows have received the outcome class = good (as compared to 72.84% for the range).'}},  420
 {'age': {}},
 {'age': {(35, 43): (181, 234, 0.7735042735042735),
          (44, 52): (96, 122, 0.7868852459016393)}}}                       } 430

Majority source
```

FIG. 4A

```
({'biasValue': -0.149,
  'valClassFavorTypeMinority': 110,
  'valTypeMinority': 190,
  'valClassFavorTypeMajority': 599,
  'valTypeMajority': 810,
  'majority': '[26,75]',
  'minority': '[19,25]',
  'protectedAttribute': 'age',
  'threshold': -0.1,
  'favourableClass': 'good',
  'class': 'class',
  'description': 'Only 57.89% of the group 19<=age<=25 received the outcome class = good, compared to 72.84% of the
group 26<=age<=75. Hence, the data exhibits group discrimination or bias against 19<=age<=25. The maximum contributin
g factor to the bias amongst rows with values 26<=age<=75 was from rows with age in the ranges [35,43] and [44,52] as
77.35% and 78.69% of such rows have received the outcome class = good (as compared to 72.84% for the range).'}},
 {'age': {}},
 {'age': {(35, 43): (181, 234, 0.7735042735042735),
          (44, 52): (96, 122, 0.7868852459016393)}}}

Majority source
```

BIAS SOURCE IDENTIFICATION AND DE-BIASING OF A DATASET

BACKGROUND

The present application relates generally to an improved data processing apparatus and method and more specifically to mechanisms for identifying bias in a given dataset and de-biasing the dataset.

Decision support computing systems rely on artificial intelligence and complex analytics to be able to perform analysis of large datasets, typically to identify patterns of data within the large datasets, to thereby generate insights into the data and provide such insights as a basis for making decisions. IBM Watson® (IBM Watson and all IBM Watson-based trademarks and logos are trademarks or registered trademarks of International Business Machines Corporation and/or its affiliates)cognitive system available from International Business Machines (IBM®) (IBM and all IBM-based trademarks and logos are trademarks or registered trademarks of International Business Machines Corporation and/or its affiliates)corporation of Armonk, New York is one example of a supercomputing system that combines artificial intelligence and complex analytics operating on large datasets to be able to make accurate predictions, automate aspects of decision support computing systems, and perform various recognition and classification operations that generate results upon which downstream computing systems base their operations. IBM Watson® has been used to implement various types of recognition, classification, decision support, and prediction computer operations including visual recognition, language translation, natural language classification, personality insights, tone analyzer, question answering, and even automated music composition and recipe generation.

The underlying artificial intelligence and analytics computing systems used in such decision support computing systems is dependent upon a machine learning process using a set of training data. If this training data comprises biases, i.e. prejudice and unfairness towards a group defined by a set of one or more attributes (often referred to as protected attributes), the biases will influence the training of the artificial intelligence computing system causing potential bias in operations of the computing systems that rely on the results of the artificial intelligence computing system to perform their operations, such as decision support operations. Such biases may result in incorrect results being generated by the artificial intelligence computing system and any downstream computing systems that rely on the results generated by the artificial intelligence computing system. Moreover, such bias may exist in the data upon which such artificial intelligence computer systems operate after training of the artificial intelligence computer system.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and memory, the memory comprising instructions executed by the processor to cause the processor to implement a source of bias identification (SoBI) computing tool that identifies sources of bias in a dataset. The method comprises executing, by a bias detection tool executing in the data processing system, a bias detection operation on results of an operation of a computer model, based on an input dataset, to generate a plurality of separate groupings of values for a protected attribute corresponding to a detected bias in the operation of the computer model. The method further comprises generating, by the SoBI computing tool, a plurality of sub-groups for each corresponding grouping of values. Each sub-group comprises an individual value, or a sub-range of values less than a total number of values in the corresponding grouping of values, for the protected attribute. The method also comprises analyzing, by the SoBI computing tool, each of the sub-groups in the plurality of sub-groups, based on at least one source of bias identification criterion, to identify one or more sources of bias in the input dataset. Each source of bias in the one or more sources of bias corresponds to a corresponding sub-group in the plurality of sub-groups. The method further comprises outputting, by the SoBI computing tool, a bias notification to an authorized computing device specifying the one or more sources of bias in the input dataset.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 is an example of a dataset and corresponding specification of input configuration parameters for a source of bias identification tool in accordance with one illustrative embodiment;

FIGS. 4A-4D are example diagrams of source of bias notifications for various example fairness metrics in accordance with one illustrative embodiment;

DETAILED DESCRIPTION

Figure 1A:
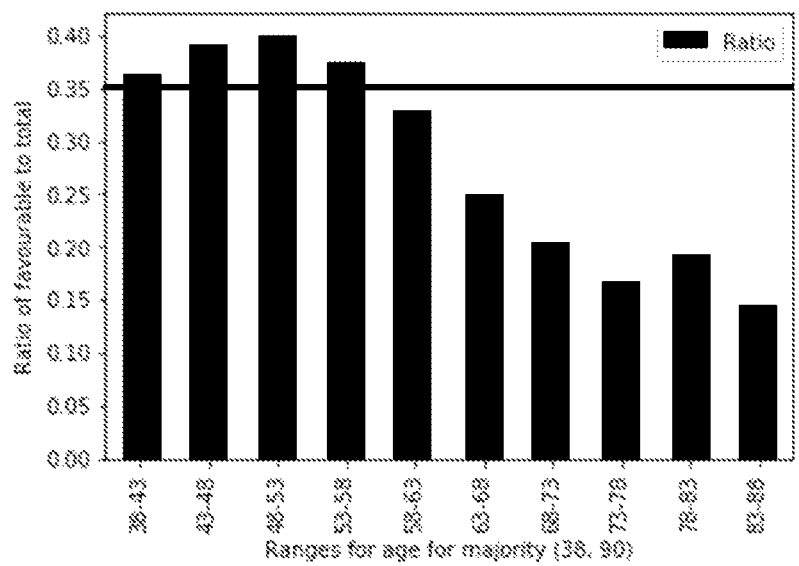
FIG. 1A shows a bar graph depicting ratios of favorable outcomes to total number of outcomes for a majority grouping in accordance with one illustrative embodiment.

As noted above, bias in datasets can cause incorrect operation of artificial intelligence computing systems and/or the downstream computing systems that operate on the results generated by such artificial intelligence computing systems. For example, if a financial industry computing system is configured to provide decision support with regard to providing credit to an applicant, e.g., home loan, credit card, etc., a trained neural network computing model may be utilized to generate recommendations based on the applicant's information obtained through an application process. The neural network computing model may be trained with a dataset that may have innate biases, e.g. a bias against authorizing credit for persons below a certain age or in favor of persons above a certain age. Such biases may be along various protected attribute lines, e.g., ethnicity, gender, age, geographic location, etc. and may be not be explicitly indicated in the dataset itself. That is, especially with large datasets that are typically used by such artificial intelligence computing systems, the bias is not readily discernible by looking at individual entries or even subsets of entries in the datasets.

Training an artificial intelligence computing system based on a dataset that contains innate biases may propagate such biases to the operational parameters used by the artificial intelligence computing system. For example, if a neural network is trained on a dataset that has a bias against persons below a particular age, then the operational parameters, e.g., weights of nodes in the neural network, may be trained through a machine learning process to be biased against future data inputs where the data includes an age parameter below the particular age. Thus, taking the banking computing system example discussed above, even though an applicant for credit may have other factors indicative of their acceptability for extending credit, the applicant may be denied because of their age due to the bias present in the training of the neural network. Such bias may not be present due to nefarious reasons but may be a matter of circumstance or other non-nefarious reasons.

The illustrative embodiments provide mechanisms for identifying a source of bias in a given set of data, such as a training dataset for use with an artificial intelligence computer system, such as a neural network, a deep learning network, a cognitive computing system (combining artificial intelligence and complex analytics, such as IBM Watson™), an ensemble computing system such as a Random Forest computing system, or other computer system or computer model that may operate on large datasets and/or be trained through a machine learning process based on a training dataset. The identification of sources of bias may include one or both of a fairness metric bias source identification or explanation-based evaluation bias source identification. In addition, the illustrative embodiments provide mechanisms for removing bias from a set of data after having identified the sources of bias in the set of data. In cases where such a set of data has been used to train an artificial intelligence (AI) computing system, such as a cognitive computing system, neural network computer model, deep learning network computer model, ensemble learning computer model, or any other machine learning computer model or computing system, the AI computing system and/or computer model may be retrained using the de-biased dataset so as to remove any bias in the training of the AI computing system or computer model.

It should be appreciated that the present invention provides an improved computer tool and improved computer tool operations that identify the source of bias in a dataset, perform de-biasing of the dataset, and perform a corrective operation for correcting the AI computing system and/or computer model after having performed de-biasing, e.g., a retraining operation using machine learning processes and the de-biased dataset as a basis for the machine learning processes. The improved computing tool of the illustrative embodiments is specifically concerned with solving the issues, arising from computer technology, in the biases present in datasets causing bias to be present in the operation of and results generated by artificial intelligence computing systems or computer models that are trained by a machine learning process based on such datasets, or otherwise operate on such datasets. Thus, the present invention is specifically directed to an improved computer tool solving a problem arising from computer technology.

As noted above, the illustrative embodiments identify the source of bias within a dataset. It should be appreciated that there is a difference between identifying the presence of bias and identifying the source of such bias in the dataset. The illustrative embodiments assume that bias has already been identified to be present in the dataset through identification of bias in the output of the AI computing system or a downstream computing system that operates on the results of the AI computing system. For example, an improved computing tool such as described in commonly assigned and co-pending U.S. patent application Ser. No. 16/589,314 entitled "Bias Identification in Cognitive Computing Systems," filed Oct. 1, 2019, which is hereby incorporated by reference, may be used to identify the presence of potential bias. The illustrative embodiments, given a bias determination showing that for a protected attribute, a bias exists, determines the source of this bias within the dataset, i.e. not just that bias exists, but what subset of protected attributes or other attributes in the dataset are the cause for the bias result.

Bias, in general, occurs when the count of favorable results for a non-privileged group, also referred to as a "minority", is much less than that of a privileged group, also referred to as a "majority," or that the count of favorable results for a privileged group (majority) is much greater than that of a non-privileged group (minority), where "much less" or "much greater" are determined relative to established threshold values, e.g., at least 25% greater or at least 20% less. The privileged (majority) or non-privileged (minority) groupings, in the context of the illustrative embodiments, are general designations of a range of values or categories of one or more protected attributes where bias is believed to potentially be present, however without a specific source of the bias being identified. The sources of bias may be specific instances or sub-ranges of protected attributes within the majority or minority groupings.

A "protected attribute" in the context of the present description refers to any attribute determined to be of a sensitive nature due to is ability to be used as a basis of prejudice or unfairness towards a group of entities. While bias with regard to human beings will be used as an example throughout the present description, it should be appreciated that bias may be present with regard to any type of entity and thus, the protected attributes may take many different forms depending on the entities for which sources of bias are being identified. For example, in some implementations, bias may be present with regard to one type of music over other types of music, one type of technology over another type of technology, one type of organization over another type of organization, or the like.

The majority and minority groupings indicate areas where there is potential bias, but do not specify why these groupings are biased, i.e. the source of the potential bias within the majority and minority groupings. For example, in a home loan decision making computing system, it may be determined that the home load decision making computing system seems to be favoring a certain group of applicants (recommending loan approval) over one or more other groups of applicants (recommending denying the loan), such that a majority grouping and minority grouping may be defined. However, it is not clear from the fact that bias potentially exists, what is causing that bias to exist within the dataset, e.g., what factors, or specific values of factors, are causing the bias to be present in the results generated by the home load decision making computing system.

For example, for a dataset it may be determined that there appears to be a bias result of an AI system or downstream computing system operating on results of the AI system, that favors persons that are 38 years of age or older (majority) and disfavors persons younger than 38 years of age (minority) or favors persons having an ethnicity categorization of "white" or "Caucasian", and disfavors persons having an ethnicity categorization of "Hispanic", "Asian", or "African American". While this indicates a general grouping of persons where favorable/unfavorable results are generated along a bias metric (protected attribute of interest), there is no indication as to why the bias is present in this grouping, e.g., is it due to a particular sub-range of ages, a particular one or sub-group of the possible categorizations of ethnicities, etc. For example, while the majority group includes all persons 38 years and older, it may be that a particular age or age sub-range within the majority has a relatively large number of favorable results, effectively increasing the favorable results for the majority grouping.

The illustrative embodiments provide mechanisms for identifying the source of bias once bias has been detected in results generated based on a given dataset, e.g., training dataset or the like. The goal in identifying the source of bias is to localize the source of bias within the dataset, thereby giving more insights into why bias may be present. In the context of the improved computing tool of the illustrative embodiments, this localization involves focusing on the portion of non-privileged data (minority data) where the favorable outcome (also sometimes referred to as a "bias metric") is less and the portion of the privileged data (majority data) where the bias metric is greater. In some illustrative embodiments, this focus is with regard to the portions of the minority data where the bias metric (favorable outcome) is less, and the portions of the majority data where the bias metric (favorable outcome) is more, than a global bias metric for the corresponding minority/majority grouping. These portions are considered both with regard to numerical protected attributes, e.g., age, and categorical protected attributes, e.g., ethnicity.

For example, after evaluation of an AI computing system or computer model to determine if bias exists using a bias detection tool such as that described in the co-pending U.S. patent application Ser. No. 16/589,314, or another tool such as AI Fairness 360, an open source toolkit for detecting bias available from IBM® Corporation of Armonk, N.Y., a definition of the majority and minority groupings where bias is potentially present may be generated. For example, the result of the bias detection may indicate a bias in a protected attribute of age where favor is given to persons 38 years of age or older and disfavor to persons 37 years or younger. As a result, the majority and minority groupings are defined by the bias detection tool, e.g., persons 38 years of age or older=majority; persons 37 years or younger=minority. It can be appreciated that such bias detection and majority/minority groupings can be performed with regard to a plurality of protected attributes to thereby generate individual majority/minority groupings along each individual protected attribute, or with regard to a combination of protected attributes, e.g., majority=age>=38 and ethnicity=White, Caucasian; minority=age<38 and ethnicity=Asian, Hispanic, African American. For ease of explanation, it will be assumed that the majority and minority groupings are along a single protected attribute, e.g., age or ethnicity.

Even though the majority and minority groupings are identified based on results of the bias detection tool, it should be appreciated that not all entities within the majority or minority groupings contribute to bias. It is important to be able to localize or pinpoint the particular sub-groups of entities which actually are a cause or source of bias in the majority and minority groupings. This is further illustrated in FIGS. 1A and 1B.

Figure 1B:
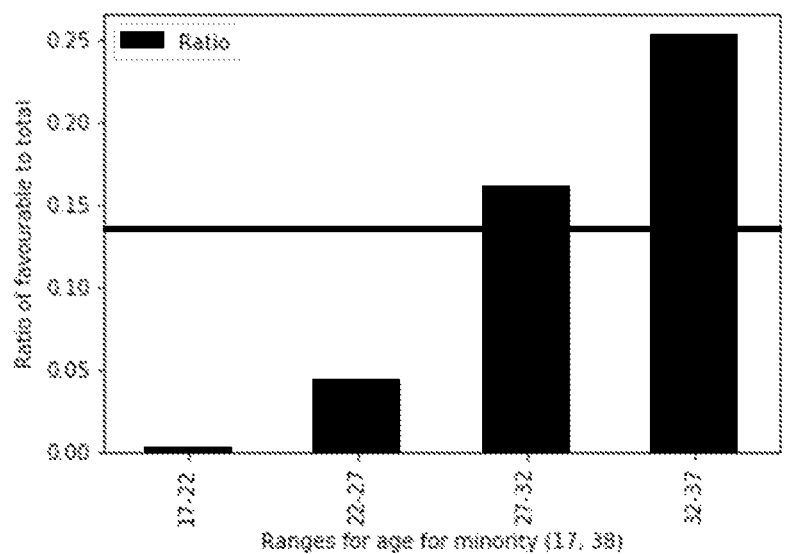
FIG. 1B shows a bar graph depicting ratios of favorable outcomes to total number of outcomes for a minority grouping in accordance with one illustrative embodiment.

FIG. 1A shows a bar graph depicting ratios of favorable outcomes to total number of outcomes for a majority grouping of a protected attribute of age, where the majority grouping comprises persons of age 38 or older. FIG. 1B shows a bar graph depicting ratios of favorable outcomes to total number of outcomes for a minority grouping of a protected attribute of age, where the minority grouping comprises persons of age 37 or younger. The bar graphs comprise sub-groups that are generated by dividing the grouping by equal length ranges. As shown in FIGS. 1A and 1B, while the majority and minority groupings may be determined to be biased, drilling down into the majority grouping shows what sub-ranges of the ratio of favorable outcomes are the sources of the bias. For the minority grouping, drilling down identifies the sub-ranges where a favorable outcome is relatively low, e.g., lowest X % of ratios of favorable outcomes (favorable outcome rate), e.g., lowest 5% of ratios of favorable outcomes. Similarly, for the majority grouping drilling down identifies the sub-ranges where a favorable outcome is relatively high, e.g., highest X % of favorable outcome rates. In the depicted example, the sub-range of age 43-58 within the majority grouping provides the highest percentage of favorable outcomes and thus, is driving bias in favor of the majority group, i.e. favoring older individuals. Similarly, the sub-range of age 27 or less is driving the bias against the minority grouping, i.e. disfavoring younger individuals.

Figure 1C:
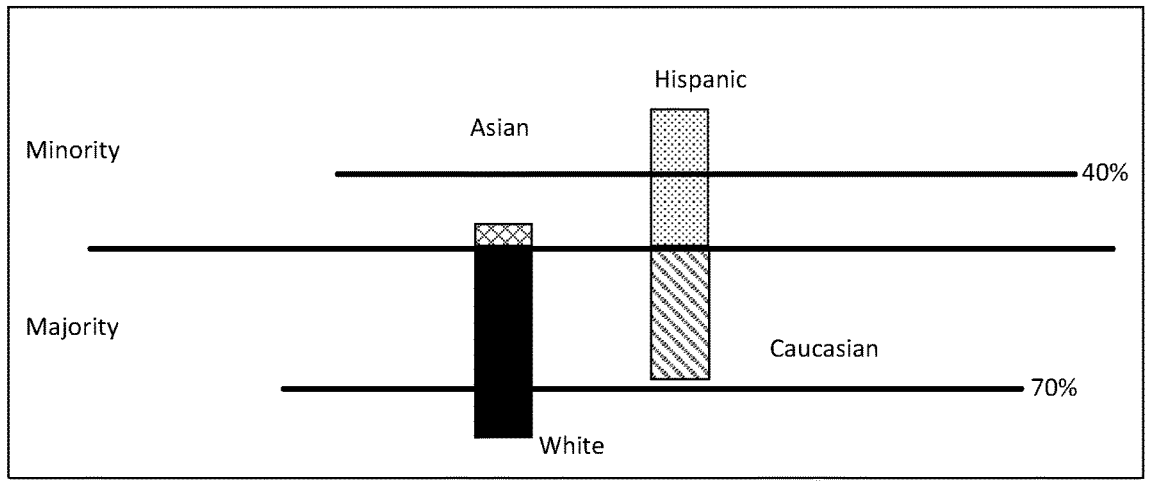
FIG. 1C shows minority and majority groupings and bar graphs representing the percentage of the grouping receiving favorable outcomes in accordance with one illustrative embodiment.

Thus, as shown in FIGS. 1A and 1B, while detecting the potential presence of bias is helpful, it does not provide sufficient information to identify with particularity the sources of such bias within the majority and minority groupings. The same is true for categorical protected attributes, such as shown in FIG. 1C. The graph shown in FIG. 1C shows minority and majority groupings and bar graphs representing the percentage of the grouping receiving favorable outcomes. As can be seen from FIG. 1C, while the minority grouping includes both Asian and Hispanic ethnicities, it is really the Asian ethnicity that is driving the lower favorable outcome in the minority grouping as they have a significantly lower percentage of favorable outcomes relative to the Hispanic ethnicity. Similarly, for the majority grouping, it can be seen that the White ethnicity designation provides a greater number of favorable outcomes than the Caucasian ethnicity designation and thus, is driving the bias in favor of the majority grouping entities.

Thus, having identified majority and minority groupings with regard to a protected attribute, the source of bias identification tool of the illustrative embodiments is provided with the dataset of interest, the protected attribute(s) of interest, the specification of the majority and minority groupings, and the identification of the favorable and/or unfavorable result. For example, FIG. 2 gives one example of a dataset corresponding to the German credit scoring database which may be used to train an AI computing system or computer model to predict a credit risk score for an individual, and which may then be used as a basis for recommending approval/denial of credit, a loan, or the like. As shown in FIG. 2, the database 210 (only a small portion of which is shown for illustration purposes) comprises entries having fields for various individual attributes including age, age category, housing, job type (skilled, unskilled), number of dependents, foreign worker, and classification (class) indicating whether the individual has been determined to be a "good" or "bad" credit risk. Below the portion of the database 210 is an example of inputs 220 that may be provided to the source of bias identification tool of the illustrative embodiments based on the portion of the database 210, which is the input dataset referred to as "german_categorical.csv" in the input 220. As can be seen from the example of FIG. 2, the inputs include the dataset filename, a class label for the bias metric (e.g., "class" in this example), an identifier of the protected attribute (e.g., "age"), a fairness metric threshold for identification of sources of bias (this is fairness metric specific and will be different for different fairness metrics as discussed hereafter), an indicator of the favorable class (e.g., "good"), and a specification of the majority and minority groupings based on ranges of protected attribute values or categories (e.g., in this case, since the protected attribute is "age", the majority and minority groupings are with regard to age ranges). It should be appreciated that the values for these inputs may be automatically generated based on the results generated by the bias detection tool and/or may be manually specified by a user via a user interface. In some cases, a user may want to investigate different specifications of majority/minority groupings and may also want to investigate different thresholds for identifying bias, such that these input variables may be manually manipulated to change the basis upon which the source of bias identification tool of the illustrative embodiments operates.

Given the majority and minority groupings, the source of bias identification (SoBI) computing tool of the illustrative embodiments divides the groupings into sub-groups. In one illustrative embodiment, for numerical protected attributes, the majority/minority groupings are divided into equal-length sub-groups, each sub-group being associated with a range of one or more values for the protected attribute, e.g., for the "age" protected attribute, the majority/minority groupings may be divided into sub-groups where each group consists of 5 years of age, e.g., if the majority grouping is age>=38, then the sub-groups may be 38-42, 43-47, 48-52, 53-57, etc. whereas the minority grouping (e.g., age<38) may be divided into sub-groups of 18-22, 23-27, 28-32, and 33-37. For categorical protected attributes, the SoBI tool divides the majority/minority groupings into single value sub-groups, e.g., if the minority group is for the ethnicity protected attribute and the minority group comprises Asian, Hispanic, and African American ethnicities, then the sub-groups may comprise each ethnicity separately.

After having divided the majority/minority groups into sub-groups, the majority/minority group, and each sub-group, is analyzed with regard to one or more fairness metrics. That is, a fairness metric is calculated for the entire group, and then is also calculated for each sub-group within the entire group. For example, in the majority group of age given previously, the fairness metric $F_g$ is calculated for the entire majority group, e.g., all of ages>=38, and is referred to as the global fairness metric. Then, for each sub-group 1 to n, the same fairness metric is calculated based on only the members within the sub-group, e.g., sub-group 1 comprising persons 38-42 is analyzed with regard to the fairness metric to generate fairness metric $F_1$, This is done for both the majority and minority groupings. The fairness metric may take many different forms, as will be described hereafter, such as a disparate impact fairness metric, a statistical parity difference fairness metric, an equal opportunity difference fairness metric, an average odds difference fairness metric, and the like. For example, in one illustrative embodiment, the AI Fairness 360 tool from IBM Corporation evaluates 70 fairness metrics with which the mechanism of the illustrative embodiments may be utilized.

Evaluating the fairness metric on the majority/minority group as a whole provides an indication of whether bias exists or not based on the accepted ranges of fairness metrics indicating fairness or bias, e.g., for a disparate impact fairness metric, which is the ratio of rate of favorable outcome for the minority group to that of the majority group, it has been determined that an ideal value is 1.0, i.e. the rates are the same, however an AI computing system or computer model is considered to be fair and not biased if this fairness metric is anywhere in the range from 0.8 to 1.0 (this range may be user specified or otherwise configurable in the inputs provided to the SoBI tool). Thus, if the disparate impact fairness metric has a value less than 1.0 this implies a higher benefit for the majority group, with a value less than 0.8 indicating bias in favor of the majority group, and if it has a value greater than 1.0 this implies a higher benefit for the minority group, i.e. a bias in favor of the minority group.

Evaluating the fairness metric of each sub-group relative the fairness metric of the group as a whole provides insights into which sub-group(s) are the source of any detected bias. The fairness metric for a sub-group is calculated with the sub-group standing in for the corresponding majority/minority group in the particular fairness metric. For example, in a disparate impact fairness metric, where the rate of favorable outcome of the majority group (privileged group) as a whole would be used in the denominator, for a sub-group in the majority, only the rate of favorable outcomes within that sub-group would be used in the fairness metric for that sub-group while the minority group ratio of favorable outcomes would remain the same as for the entire minority group.

Put another way, assume that $R_{MAJ}$ is the rate of favorable outcomes for the majority group and $R_{MIN}$ is the rate of favorable outcomes for the minority group. The global disparate impact is the ratio of $R_{MIN}$ to $R_{MAJ}$, or $DI_G = R_{MIN}/R_{MAJ}$. For a sub-group i, where i=1 to n (where n is the total number of sub-groups in the majority grouping), in the majority group, the rate of favorable outcomes is denoted $R_{MAJi}$ for that sub-group and is calculated as the ratio of favorable outcomes of members of the sub-group to the total number of members of the sub-group. To then calculate the disparate impact of sub-group i, the ratio $DI_i = R_{MIN}/R_{MAJi}$ is calculated. This is done for each sub-group to obtain a set of disparate impact fairness metric values $DI_i$ to $DI_n$, for each of the sub-groups.

The same is true for the minority grouping where each sub-group j, where j=1 to m (where m is the total number of sub-groups in the minority grouping), has a corresponding rate of favorable outcomes denoted $R_{MINj}$, which is again calculated as the ratio of favorable outcomes of members of the sub-group to the total number of members of the sub-group. Thus, the disparate impact of sub-group j is the ratio $DIj = R_{MINj}/R_{MAJ}$. This again may be calculated for each subgroup so as to generate disparate impact fairness metric values $DI_j$ to $DI_m$.

For sub-groups in the majority grouping, if the fairness metric of the sub-group is greater than the fairness metric for the group as a whole, or is at least a threshold amount greater than the fairness metric for the group as a whole, e.g., 5% greater, then the sub-group is flagged or otherwise identified as a potential source of bias. For sub-groups in the minority grouping, if the fairness metric of the sub-group is less than the fairness metric for the group as a whole, or is at least a threshold amount less than the fairness metric for the minority group as a whole, e.g., 5% less, then the sub-group is flagged or otherwise identified as a potential source of the bias. In one illustrative embodiment, these thresholds are set to identify the highest X % of majority group members for which favorable outcomes are generated and the lowest X % of minority group members for which favorable outcomes are generated, e.g., X may be any desired value for the particular implementation, such as 5% in one illustrative embodiment.

This same process may be performed for cases where the protected attribute is a categorical value rather than a numeric value or range of values, such as in the case of ethnicity, for example. In such a case the majority grouping may be a particular set of ethnicities and the minority grouping may be a different set of ethnicities. For each, the groups are divided into individual sub-groups corresponding to each individual category within that group. Thus, if a majority group comprises White and Caucasian, for example, then two sub-groups, one for White and one for Caucasian, would be generated. Similarly, if the minority group comprises Asian, Hispanic, and African American, then 3 sub-groups may be generated, one for each of Asian, Hispanic, and African American. A similar evaluation may then be performed for the majority/minority groups as a whole and then for each sub-group so as to determine the fairness metrics for each and then compare them to identify potential sources of bias.

Thus, potential sources of bias are specifically identified or localized within the majority and/or minority groupings developed from the bias detection tool results. These potential sources of bias pinpoint the particular sub-groups within the majority and/or minority groupings. The granularity of such groupings may be configured to any desirable range of values and/or categories.

Moreover, it should be appreciated that the evaluation discussed above may be performed with regard to one or more fairness metrics. As noted above, the AI Fairness 360 tool available from IBM Corporation is capable of evaluating 70 fairness metrics in order to detect bias. These same fairness metrics, or a subset of these fairness metrics, may be used as a basis for evaluations by the SoBI tool of the illustrative embodiments. In embodiments where more than one fairness metric is evaluated by the SoBI tool, logic may be provided for combining the results of the fairness metric evaluations in order to determine specific potential sources of bias within the majority and minority groupings. The logic may take the form of rules, a trained neural network, or any other computing model that is configured to combine the fairness metrics for individual sub-groups and determine for each sub-group whether or not it is a potential source of bias. For example, a neural network may be trained to combine the fairness metrics of the sub-group (as inputs to the neural network) and generate a classification or probability output indicating whether or not that sub-group is likely a potential source of bias within the majority/minority grouping.

Having identified localized sources of potential bias in the dataset through an evaluation of the fairness metrics, targeted and localized de-biasing of the dataset is made possible by removing samples from the dataset that correspond to the specific potential sources of bias identified by the SoBI tool of the illustrative embodiments. That is, a localized de-biasing tool is provided by the mechanisms of the illustrative embodiments to surgically remove the sub-groups determined to be sources of bias in one or both of the majority and minority groups. The resulting de-biased dataset may then be provided for performing a corrective operation with regard to the AI computing system, computer model, or other downstream computing system, that is trained on or operates on the dataset. For example, in one illustrative embodiment, the de-biased dataset is provided as de-biased training data that is used by a machine learning computing system to train a computer model, such as a neural network, deep learning network, ensemble learning system, or the like, to perform a decision support operation, classification operation, recommendation operation, or any other type of artificial intelligence based computer operation.

In de-biasing the dataset, evaluations may be performed on the dataset both before and after the de-biasing so as to determine a measure of bias drop in the dataset. In general, the bias drop is the difference of a favorable outcome (bias metric) of the original dataset and the bias metric of the de-biased dataset, divided by the bias metric of the original dataset. The bias drop is a reporting metric which showcases how much de-biasing has been achieved.

The above illustrative embodiments operate on the input datasets to an AI computing system or computer model so as to determine the potential sources of bias in the dataset and then de-bias that dataset. It should be appreciated that in addition, or as a separate operation, the output of the AI computing system or computer model may also be evaluated, such as by using a model interpretability tool, to determine potential sources of bias. These operations may be performed together or separately in order to pinpoint or localize potential sources of bias in the dataset and use this identification as a basis for performing de-biasing operations on the dataset.

Thus, in some illustrative embodiments, rather than, or in addition to, dividing the majority/minority groupings and using fairness metrics for evaluating the potential sources of bias as described above, after having detected bias using a bias detection tool as noted previously, a model interpretability tool, such as Local Interpretable Model-agnostic Explanations (LIME) interpretability tool, for example, may be used to generate an explanation for a classification generated by an AI computing system or computer model for a given portion of the dataset. The LIME interpretability tool is described, for example, in Ribeiro et al. "Why should I trust you?: Explaining the predictions of any classifier," Proceedings of the 22nd ACM SIGKDD International Conference on Knowledge Discovery and Data Mining. ACM (2016). The basis for this analysis is that bias arises if minority entities are receiving more unfavorable classifications (labels) by the AI computing system or computer model and majority entities are receiving more favorable classifications (labels). In such cases, if protected attributes are weighted, in the explanation for the classification generated by the model interpretability tool, more heavily than non-protected attributes (i.e. attributes other than protected attributes), then identifying those protected attribute value subsets can be used to identify particular sources of bias.

With this additional mechanism of the illustrative embodiments, after having detected bias in the operation of an AI computer system or computer model, a majority grouping and minority grouping according to one or more protected attributes of interest are defined in a manner similar to the embodiments previously described, along one or more protected attributes of interest. For the minority grouping, for each entity in the minority grouping, corresponding input data is input to the AI computer system or computer model to thereby generate a classification result and the model interpretability tool operates on the AI computer system or computer model to generate an explanation output that identifies the top k features of the input data used to generate the classification output, i.e. which features of the input data were most influential in generating the classification output. The descriptions are analyzed relative to the protected attributes of interest to determine if the one or more of the protected attributes of interest appear in the top k features of the input data, e.g., k=3 results in the top 3 features of the input data being identified, where the features may correspond to attributes of the entity, e.g., age, ethnicity, gender, income level, or any other descriptive attribute of the entity. If so, then the corresponding matching protected attributes of interest and their corresponding values are stored. This process may be performed for each entity in the minority grouping such that a set of matching protected attributes and corresponding values are generated. The values are aggregated to identify the sources of bias in the dataset with regard to disfavor for minority entities.

The same operations may be performed for the majority grouping with favorable model predictions to thereby generate a second set of sources of bias in the dataset but with regard to bias in favor of the majority entities. The second set of sources of bias may be combined with the first set of sources of bias to generate a final set of sources of bias in the dataset. The sources of bias are any entities in the majority or minority groupings that have the corresponding values of protected attributes specified in the final set of sources of bias. The final set of sources of bias may then be used to de-bias the dataset by removing samples associated with the particular values of protected attributes specified in the final set of sources of bias. Again, a bias drop metric may be calculated to identify an amount of bias reduction due to the de-biasing of the dataset, which can then be reported to the provider of the dataset and/or AI computer system or computer model.

In some illustrative embodiments, this final set of sources of bias generated by the model interpretability tool mechanisms may also be combined with the sources of bias identified via the fairness metric mechanisms previous described above. Non-overlapping sources of bias may be identified via the combination of the sets of sources of bias and used as a basis for de-biasing the dataset. Thus, not only can sub-groups be identified for de-biasing, but other individual values of protected attributes that may be influential in introducing bias, but which are not part of an identified sub-group that is a source of bias, may also be identified for de-biasing. As with the previously described embodiments, following de-biasing, the de-biased dataset may be used with any AI computing system, computer model, or downstream computing system to reduce any bias in the operation of these systems/models. For example, re-training of an AI computing system, computer model, or the like may be performed and/or the operation of the downstream computing system may be performed based on the de-biased dataset rather than the original dataset where bias was determined to be present.

Thus, the mechanisms of the illustrative embodiments provide an improved computing tool and computing tool operation that identifies sources of bias in a given dataset. The sources of bias may be determined based on fairness metric evaluations and/or explanation based determinations. Based on the identified sources of bias, de-biasing operations may be performed to remove the sources of bias from the dataset. In cases where an AI computing system or computer model has been trained using the original dataset, corrective operations may be performed to retrain the AI computing system or computer model based on the de-biased dataset to thereby reduce any bias present in the operation of the trained AI computing system or computer model.

Before continuing the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms in an improved computer tool and computer tool operation for identifying the source of bias in a given dataset and in the operation of a trained artificial intelligence based computing system or computer model which may have been trained or which may operate on a given dataset having detected bias. The trained artificial intelligence based computing system or computer model may be implemented as part of or utilized by a cognitive computing system that employs the trained artificial intelligence (AI) based computing system or computer model to generate results upon which the cognitive computing system operates to generate cognitive computing responses to user requests, for example, e.g., answering natural language questions, performing image recognition, generating recommendations, decision support operations, or any other cognitive computing operation. The cognitive computing system may comprise any artificial intelligence based computing system that is trained through a machine learning process so as to generate results from given inputs, where the results have an acceptable level of error or loss after such training. For example, the cognitive computing system may be comprised of a single neural network, multiple neural networks, one or more rules based engines, a deep learning computing system such as the IBM Watson™ cognitive computing system, or the like. For purposes of illustration in the description of the illustrative embodiments hereafter, the cognitive computing system will be assumed to be the IBM Watson™ cognitive computing system, and in particular an implementation of the IBM Watson™ cognitive computing system in which one or more deep learning neural networks trained through a machine learning process, supervised or unsupervised, is implemented.

The AI computing system or computer model of the cognitive computing system is trained through a machine learning process that involves an iterative adjustment of operational parameters of the machine learning computer models employed by the cognitive computing system so as to minimize an error or loss in the outputs or results generated by the cognitive computing system. For example, in the case of a neural network, the weights of nodes in the neural network may be iteratively adjusted based on the input of training data and the comparison of outputs or results to expected outputs/results (ground truth) which indicates an error or loss. The iterative adjustment may be based on an identification of features that were most influential in the generation of the output such that the weights associated with nodes processing such features may be adjusted to minimize the influence of those features on the output and thus, reduce the loss or error in the output generated. This machine learning process is referred to as training the machine learning computer model or training the cognitive computing system herein.

Through the training of an AI computing system or computer model of the cognitive computing system, bias may be inadvertently introduced into the operation of the cognitive computing system due to such bias being present in training datasets. For example, in the case of gender bias, training datasets may associate with females or males, traditional or stereotypical associations of characteristics, objects, events, etc. which reflect a bias (whether it be a positive or negative bias), e.g., likes, dislikes, limitations, strengths, etc. For example, a bias may be that females prefer the color "pink" and males do not prefer the color "pink" or that female children like to play with "dolls" and male children do not like to play with dolls. Such bias may be present in the training datasets in various ways, e.g., a relative number of training data instances having correct results being "pink" or "dolls" for corresponding features of "female" being substantially greater than other possible results. In other cases, as previously described above, bias may be associated with other types of protected attributes including not only gender, but also ethnicity, age, or any other protected attribute specific to the types of entities for which bias is being evaluated.

The problem with bias embedded into cognitive computing systems, or trained AI computing systems or computer models employed by these cognitive computing systems, is that the results generated by these systems/models may be incorrect. The majority of the time, the output of a trained cognitive computing system or trained computer model is processed through additional computer logic within a calling application. Depending on the calling application, various incorrect outcomes could result. For example, trained cognitive computing systems or trained computer models with bias "trained in" or embedded in the cognitive computing system and/or computer models could possibly cause unfair/unfavorable financial decisions, unfair/unfavorable decisions about the incarcerated, unfair/unfavorable decisions about educational needs and projects, etc. Practically any current system in use today that utilizes the operation of a trained AI computing system or computer model component has a possibility of bias being "trained in" and used indirectly to make decisions based on these biases. The entities using such biased cognitive computing systems and/or computer models, e.g., companies, governmental agencies, or other individuals or organizations, may experience legal or public dissatisfaction issues.

The illustrative embodiments provide mechanisms for identifying the source of bias in a dataset which may be used as a basis for an operation by an AI computing system or computer model or as a basis for training such an AI computing system or computer model. While age bias is used as a primary example throughout this description, it should be appreciated that the mechanisms of the illustrative embodiments may be implemented to identify any type of bias that may be present in the operation of an AI computing system or computer model, such as bias for/against particular parties, organizations, objects, etc. for various reasons, e.g., bias toward/against a particular political party, a particular special interest group, etc. Moreover, the bias that is identifiable may be either positive or negative bias, as the mechanisms are configured to identify bias itself. Whether or not the bias is "negative" or "positive" is a human judgment and is not relevant to the operation of the mechanisms of the illustrative embodiment.

The mechanisms of the illustrative embodiments may be configured to operate on a dataset associated with a detected bias to identify particular sources of bias in the dataset. This detected bias may be detected in the operation of an already trained AI computing system or computer model (assumed hereafter to be a computer model, such as a neural network, deep learning network, or the like, for ease of explanation) which may or may not have a configuration, due to training, which introduces bias into the results generated by the trained computer model. The mechanisms of the illustrative embodiments may also be configured to operate on outputs of the trained AI computing system or computer model to determine explanations for the outputs and sources of bias based on these explanations. It should be appreciated that when reference is made to the trained computer model herein, such references may also be considered directed to a trained cognitive computing system in which such trained AI computing systems or computer models are implemented. That is, a trained cognitive computing system may use one or more trained computer models to perform cognitive computing operations, however the mechanisms of the claimed invention may be applied to a single trained computer model as well. Thus, the description of mechanisms of the illustrative embodiments with references to a trained computer models may also be applied to trained cognitive computing system as well.

As an overview, a cognitive computing system (or more simply a "cognitive system") is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process, but within the limitations of a computer architecture, as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware.

The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, financial trend analysis, financial investment recommendations, credit scoring and credit/loan approval recommendations, and other types of recommendation generation, e.g., items of interest to a particular user, potential new contact recommendations, or the like. IBM Watson™ is an example of one such cognitive system which can process human readable language and identify inferences between text passages with human-like high accuracy at speeds far faster than human beings and on a larger scale. The IBM Watson™ cognitive system has many different implementations in which the IBM Watson cognitive system has been configured for different cognitive functions, e.g., IBM Chef Watson® (IBM Chef Watson and all IBM Chef Watson-based trademarks and logos are trademarks or registered trademarks of International Business Machines Corporation and/or its affiliates)generates recipes for users, IBM Watson Ads™ provides an artificial intelligence (AI) solution for advertising, and IBM Watson Health™ provides a number of different tools for implementing AI solutions to perform various patient health related cognitive computing functions, etc.

Figure 3:
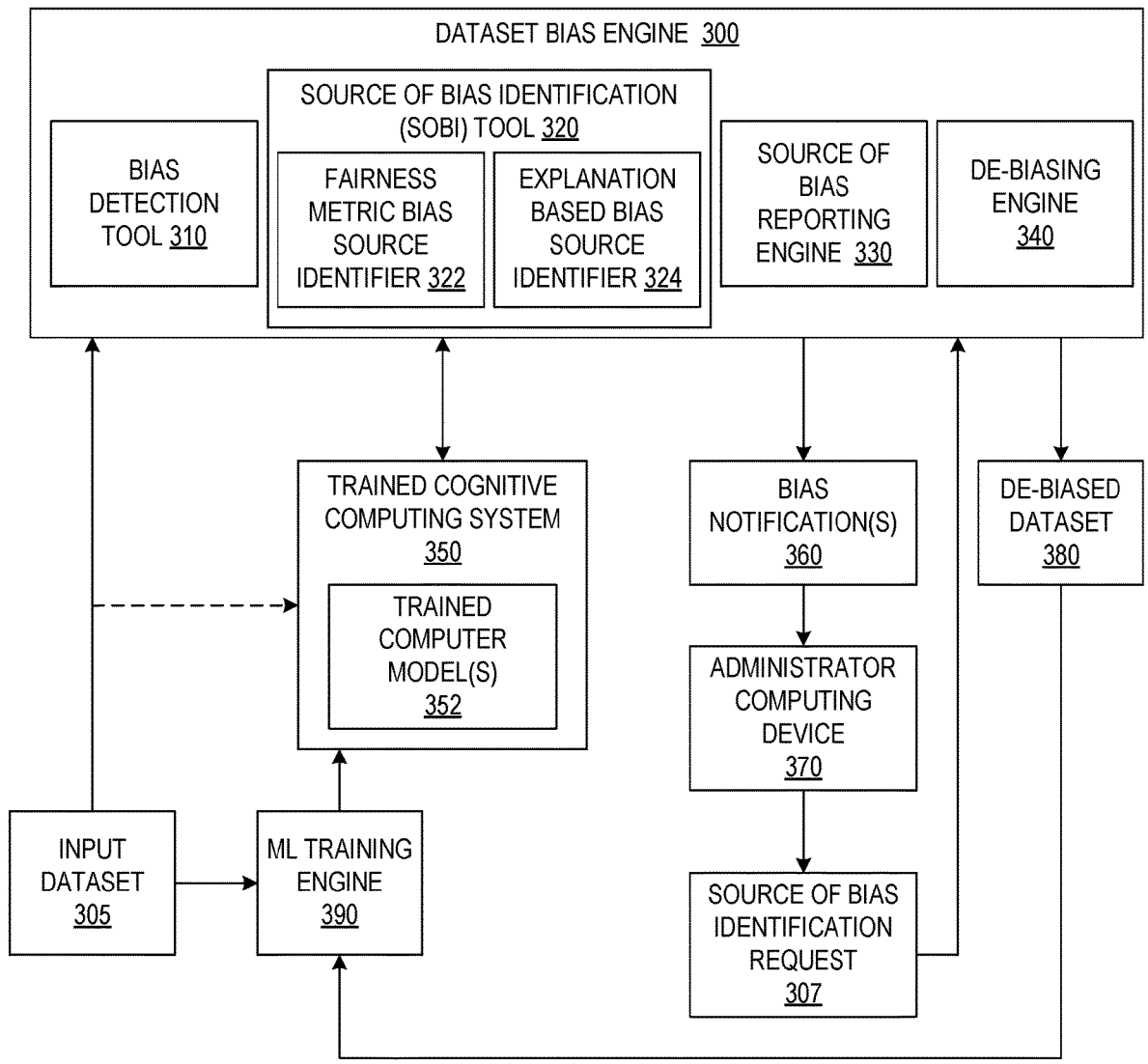
FIG. 3 is an example block diagram illustrating the primary operational components of an improved computing tool that performs source of bias identification, dataset de-biasing, and/or corrective actions in accordance with one illustrative embodiment.

FIG. 3 is an example block diagram illustrating the primary operational components of an improved computing tool that performs source of bias identification, dataset de-biasing, and/or corrective actions in accordance with one illustrative embodiment. As shown in FIG. 3, the primary operational components include a dataset bias engine 300 that operates to detect the presence of bias in the operation of a trained cognitive computing system 350 and/or trained computer model 352 and determines the source of the bias in the input dataset 305 and reports this source of bias to an administrator computing device 370 in one or more bias notifications 360. In some illustrative embodiments, the identification of the source of bias is also a basis upon which the dataset bias engine 300 performs a de-biasing operation to remove the source of bias from the input dataset 305 and thereby generate a de-biased dataset 380. The de-biased dataset 380 may be used as a basis for performing corrective operations with regard to the trained cognitive computing system 350 and/or trained computer model 352, such as retraining the trained computer model 352 via a machine learning training engine 390 that uses the de-biased dataset 380 to perform the retraining rather than the original input dataset 305.

The dataset bias engine 300 may include a bias detection tool 310, a source of bias identification (SoBI) tool 320, a source of bias reporting engine 330, and a de-biasing engine 340. It should be appreciated that these are the primary operational elements of the dataset bias engine 300 and other elements may also be present for facilitating the operations of these primary operational elements. For example, various communication elements, control elements, and the like, which facilitate the interaction of the primary operational elements with each other and with components of other computing systems, may be provided, but are not depicted for ease of explanation of the improvements provided by the improved computing tool and improved computing operations of the illustrative embodiments.

The bias detection tool 310 provides the computer executed logic and data structures used to perform bias detection in the operation of an AI computing system or computer model, such as trained cognitive computing system 350 and/or trained computer model 352. The bias detection tool 310 only detects the presence of bias in the operation of the computing system/computer model but does not identify the particular sources of bias in the input dataset 305 upon which the computing system/computer model operates or is trained. Examples of bias detection tools 310 which may be utilized to detect the presence of bias may include the bias detection tool such as that described in the co-pending U.S. patent application Ser. No. 16/589,314, the AI Fairness 360 tool available from IBM® Corporation, or any other bias detection tool currently available or later developed.

The bias detection tool 310 operates on results generated by the trained cognitive computing system 350 and/or trained computer model 352 (which in some cases may be independent of the trained cognitive computing system 350 and not necessarily integrated into the computing system 350) based on a processing of the input dataset 305. This processing of the input dataset 305 may be, for example, part of a machine learning process implemented by machine learning (ML) training engine 390 which provides the computer executed logic and data structures to perform the machine learning operation, e.g., linear regression or the like, to train the computer model 352 and/or trained cognitive computing system 350. Alternatively, the input dataset 305 may be a dataset upon which the already trained computer model 352 and/or trained cognitive computing system 350 operates (represented by the dashed line in FIG. 3) and which may be separately analyzed by the bias detection tool 310 to detect whether the input dataset 305 has a bias with regard to one or more protected attributes.

The bias detection tool 310 generates results that identify criteria for defining a majority (privileged) group and minority (non-privileged) group along one or more protected attributes. For example, the result of the bias detection may indicate a bias in a protected attribute of age where favor is given to persons 38 years of age or older and disfavor to persons 37 years or younger. As a result, the majority and minority groupings are defined by the bias detection tool, e.g., persons 38 years of age or older=majority; persons 37 years or younger=minority. As mentioned previously, it can be appreciated that such bias detection and majority/minority groupings can be performed with regard to a plurality of protected attributes to thereby generate individual majority/minority groupings along each individual protected attribute, or with regard to a combination of protected attributes, e.g., majority=age>=38 and ethnicity=White, Caucasian; minority=age<38 and ethnicity=Asian, Hispanic, African American. Moreover, it is not a requirement that the majority and minority groupings be contiguous with one another, i.e. it is not necessary for the boundaries of the groupings to touch or intersect. Thus, for example, the majority grouping could be defined as persons age>=38 and the minority grouping could be defined as persons age<25 with a gap between the groupings of persons aged 26-37.

Having detected bias, the bias detection tool 310 may send a request to the SoBI tool 320 to perform its operations for identifying the source of bias such that the source of bias may be reported via the source of bias reporting engine 300 to an administrator or other authorized personnel for corrective action, such as by transmitting a bias notification 360 to the administrator computing device 370. Alternatively, the bias detection tool 310 may, via the reporting engine 330, transmit a bias notification 360 to the administrator computing device 370 indicating the presence of bias in the operation of the computer system/computer model 350/352, and asking if the administrator wishes to identify the source of the bias and/or de-bias the input dataset 305. For example, the administrator, operating on the administrator computing device 370, may interface with a graphical user interface of the dataset bias engine 300 to input a source of bias identification request 307 and specify the configuration parameters for performing the source of bias identification, de-biasing of the input dataset 305, and potentially the corrective action to perform after performing the de-biasing of the input dataset 305.

Whether done automatically by the bias detection tool 310, or by a human administrator in response to a notification of the presence of bias, the defined majority and minority groupings defined based on the criteria of bias identified by the bias detection tool 310 with regard to one or more protected attributes, are provided to the source of bias identification (SoBI) tool 320 via a request to perform source of bias identification. It should be noted that the SoBI tool 320 also has access to the input dataset 305 and, in some illustrative embodiments, the results generated by the trained cognitive computing system 350 and/or trained computer model 352 based on a processing of the input dataset 305, either during runtime operation or during training.

The request to perform source of bias identification may include, for example, a specification of the dataset of interest, e.g., input dataset 305 in the depicted example, the protected attribute(s) of interest which were identified by the bias detection tool 310 as being a basis of bias, e.g., age, gender, ethnicity, political affiliation, etc., the specification of the majority and minority groupings with regard to values of the protected attribute(s) of interest that mark the boundaries of the grouping, and the identification of the favorable and/or unfavorable result. Reference is again made to FIG. 2 which gives one example of an input dataset, such as input dataset 305, and configuration parameter inputs, which may be part of a source of bias identification request, that are provided to the SoBI tool 320. As shown in FIG. 2, and discussed previously, these configuration parameters may include the dataset filename for the input dataset 305 such that the input dataset 305 may be accessed from storage, a class label for the bias metric which is the result generated by the trained cognitive computing system 350 and/or trained computer model 352 that may be biased (e.g., "class" in the depicted example), an identifier of the protected attribute (e.g., "age"), a fairness metric threshold for identification of sources of bias (this is fairness metric specific and will be different for different fairness metrics as discussed hereafter), an indicator of the favorable result, or "class" in the depicted example (e.g., "good"), and a specification of the majority and minority groupings based on ranges of protected attribute values or categories (e.g., in the depicted example, since the protected attribute is "age", the majority and minority groupings are with regard to age ranges). These configuration parameter values for may be automatically generated based on the results generated by the bias detection tool 310 and/or may be manually specified by a user via a user interface, such as an administrator operating on the administrator computing device 370 and utilizing an interface provided by the dataset bias engine 300, for example.

Given the majority and minority groupings, the source of bias identification (SoBI) computing tool 320 of the illustrative embodiments, which provides the computer executed logic and data structures to perform source of bias identification, divides the groupings into sub-groups. In one illustrative embodiment, for numerical protected attributes, the majority/minority groupings are divided into equal-length sub-groups, each sub-group being associated with a range of one or more values for the protected attribute. For categorical protected attributes, the SoBI tool 320 divides the majority/minority groupings into single value sub-groups where each value corresponds to one category in the plurality of possible categories for the categorical protected attribute.

In one illustrative embodiment, after having divided the majority/minority groups into sub-groups, the fairness metric bias source identifier 322 of the SoBI tool 320 analyzes the majority/minority group, and each sub-group, with regard to one or more fairness metrics. That is, the fairness metric bias source identifier 322 calculates a fairness metric for the entire group, and then also calculated for each sub-group within the entire group, e.g., the majority group and each individual sub-group within the majority group, as well as the minority group and each individual sub-group within the minority group. The fairness metric bias source identifier 322 then compares the fairness metrics of each sub-group to their corresponding majority group or minority group to determine if criteria are satisfied to flag or otherwise identify the sub-group as a source of bias. The flagged or otherwise indicated sub-groups may then be stored as sources of bias which may then be reported in one or more bias notifications 360 to the administrator computing device 370, as discussed hereafter.

The fairness metric may take many different forms. In fact, known bias detection tools, such as AI Fairness 360, calculate a variety of fairness metrics (70 fairness metrics in the case of AI Fairness 360) which may be used as a basis for calculating fairness metrics in the fairness metric bias source identifier 322. Examples of such fairness metrics include a disparate impact fairness metric, a statistical parity difference fairness metric, an equal opportunity difference fairness metric, and an average odds difference fairness metric. While these fairness metrics will be used as examples in the present description, it should be appreciated that the illustrative embodiments are not limited to such fairness metrics and any other fairness metrics that are currently known or later developed may be used without departing from the spirit and scope of the present invention.

The disparate impact fairness metric is defined as the ratio of rate of favorable outcome for the unprivileged (minority) group to that of the privileged (majority) group and has an ideal value of 1.0 such that a value less than 1 implies higher benefit to the privileged (majority) group and a value greater than 1 implies a higher benefit for the unprivileged (minority) group. In some illustrative embodiments, fairness is determined to exist, i.e. no bias or an acceptable level of bias, if the disparate impact fairness metric is within the range of approximately 0.8 to 1.0, however this range may be modified depending on the desired implementation.

The statistical parity difference fairness metric is defined as the difference of the rate of favorable outcomes received by the unprivileged group to the privileged group. The ideal value of statistical parity is 0 with a determination of fairness being present, i.e. no bias or an acceptable level of bias, if the statistical parity difference is in the range of approximately −0.1 and 0.1, however this range may be modified depending on the desired implementation.

The equal opportunity difference fairness metric is defined as the difference of true positive rates between the unprivileged and privileged groups. That is, for classification results of an AI computing system or computer model, there are the predicted classifications generated by the computing system/computer model, and the true classifications known in the ground truth or golden set of the training data which is used to train the computing system/computer model. Thus, there are four possibilities in the results of the computing system/or computer model, i.e. true positive (favorable prediction matches favorable true classification), false positive (favorable prediction does not match unfavorable true classification), false negative (unfavorable prediction does not match favorable true classification), and true negative (unfavorable prediction matches unfavorable true classification). The equal opportunity difference fairness metric essentially stating that ideal fairness exists when the true positive rates between the unprivileged and privileged groups are the same, where the true positive rate is the ratio of true positives to the total number of actual positives for a given group. The ideal value for the equal opportunity difference fairness metric is 0 with values less than 0 implying higher benefit for the privileged group and a value greater than 0 implying higher benefit for the unprivileged group. In one illustrative embodiment, fairness for the equal opportunity difference fairness metric may be determined to exist if the value falls within the range of approximately −0.1 and 0.1.

The average odds difference fairness metric is defined as the average difference of false positive rage (false positive/all negatives) and true positive rate (true positive/all positives) between the unprivileged and privileged groups. The ideal value for the average odds difference fairness metric is 0 with a value less than 0 implying higher benefit for the privileged group and a value greater than 0 implying higher benefit for the unprivileged group. In one illustrative embodiment, fairness for the average odds difference fairness metric is determined to exist if the value falls within the range of approximately −0.1 and 0.1.

The fairness metric bias source identifier 322 evaluates one or more of the fairness metrics with regard to each sub-group relative the same one or more fairness metrics with regard to the majority/minority group as a whole in order to provide insights into which sub-group(s) are the source of any detected bias. For sub-groups in the majority grouping, if the fairness metric of the sub-group is greater than the fairness metric for the group as a whole, or is at least a threshold amount greater than the fairness metric for the group as a whole, then the sub-group is flagged or otherwise identified as a potential source of bias. For sub-groups in the minority grouping, if the fairness metric of the sub-group is less than the fairness metric for the group as a whole, or is at least a threshold amount less than the fairness metric for the minority group as a whole, then the sub-group is flagged or otherwise identified as a potential source of the bias. In one illustrative embodiment, these thresholds are set to identify the highest X % of majority group members for which favorable outcomes are generated and the lowest X % of minority group members for which favorable outcomes are generated, e.g., X may be 5% in one illustrative embodiment.

This same process may be performed for cases where the protected attribute is a categorical value rather than a numeric value or range of values, such as in the case of ethnicity, for example. In such a case the majority grouping may be a particular set of ethnicities and the minority grouping may be a different set of ethnicities. For each, the groups are divided into individual sub-groups corresponding to each individual category within that group. Thus, if a majority group comprises White and Caucasian, for example, then two sub-groups, one for White and one for Caucasian, would be generated. Similarly, if the minority group comprises Asian, Hispanic, and African American, then 3 sub-groups may be generated, one for each of Asian, Hispanic, and African American. A similar evaluation may then be performed for the majority/minority groups as a whole and then for each sub-group so as to determine the fairness metrics for each and then compare them to identify potential sources of bias.

Thus, the fairness metric bias source identifier 322 of the SoBI tool 320 identifies potential sources of bias within the majority and/or minority groupings developed from the bias detection tool 310 results based on the input dataset 305 and an evaluation or one or more fairness metrics both with regard to the majority/minority group as a whole and each individual sub-group within the majority/minority groups. These potential sources of bias pinpoint the particular sub-groups within the majority and/or minority groupings. The granularity of such groupings may be configured to any desirable range of values and/or categories, e.g., for an age protected attribute, the granularity of sub-groupings may be set to 2 years, 5 years, 10 years, etc.

Moreover, it should be appreciated that the evaluation discussed above may be performed with regard to one or more fairness metrics. In embodiments where more than one fairness metric is evaluated by the fairness metric bias source identifier 322 of the SoBI tool 320, computer executed logic may be provided in the fairness metric bias source identifier 322 for combining the results of the fairness metric evaluations in order to determine specific potential sources of bias within the majority and minority groupings. The logic may take the form of rules, a trained neural network, or any other computing model that is configured to combine the fairness metrics for individual sub-groups and determine for each sub-group whether or not it is a potential source of bias. For example, a neural network may be trained to combine the fairness metrics of the sub-group (as inputs to the neural network) and generate a classification or probability output indicating whether or not that sub-group is likely a potential source of bias within the majority/minority grouping based on the combination of fairness metrics calculated for that sub-group.

Having identified localized sources of bias in the input dataset 305 through an evaluation of the fairness metric(s) by the fairness metric bias source identifier 322 of the SoBI tool 320, targeted and localized de-biasing of the dataset is made possible by removing samples from the dataset that correspond to the specific sources of bias identified by the SoBI tool 320. It should be noted that de-biasing may be performed automatically or in response to a user request to perform such de-biasing. The user request may be included in the original request to identify the sources of bias or may be provided in response to a bias notification 360 specifying the source of bias found by the fairness metric bias source identifier. That is, the SoBI tool 320 may, in response to the operation of the fairness metric bias source identifier 322 identifying one more sources of bias in the majority and/or minority groupings, may report, via the source of bias reporting engine 330, the sources of bias to the administrator computing device 370 via one or more bias notifications 360. These source of bias notifications 360 may specify the source of bias configuration parameters used, the reasoning for identifying bias in the majority/minority groups as a whole, the results of source of bias identification, e.g., the sub-groups flagged or otherwise identified as being sources of bias, and the reasoning for identifying the particular sources of bias.

Figures 4C, 4D:
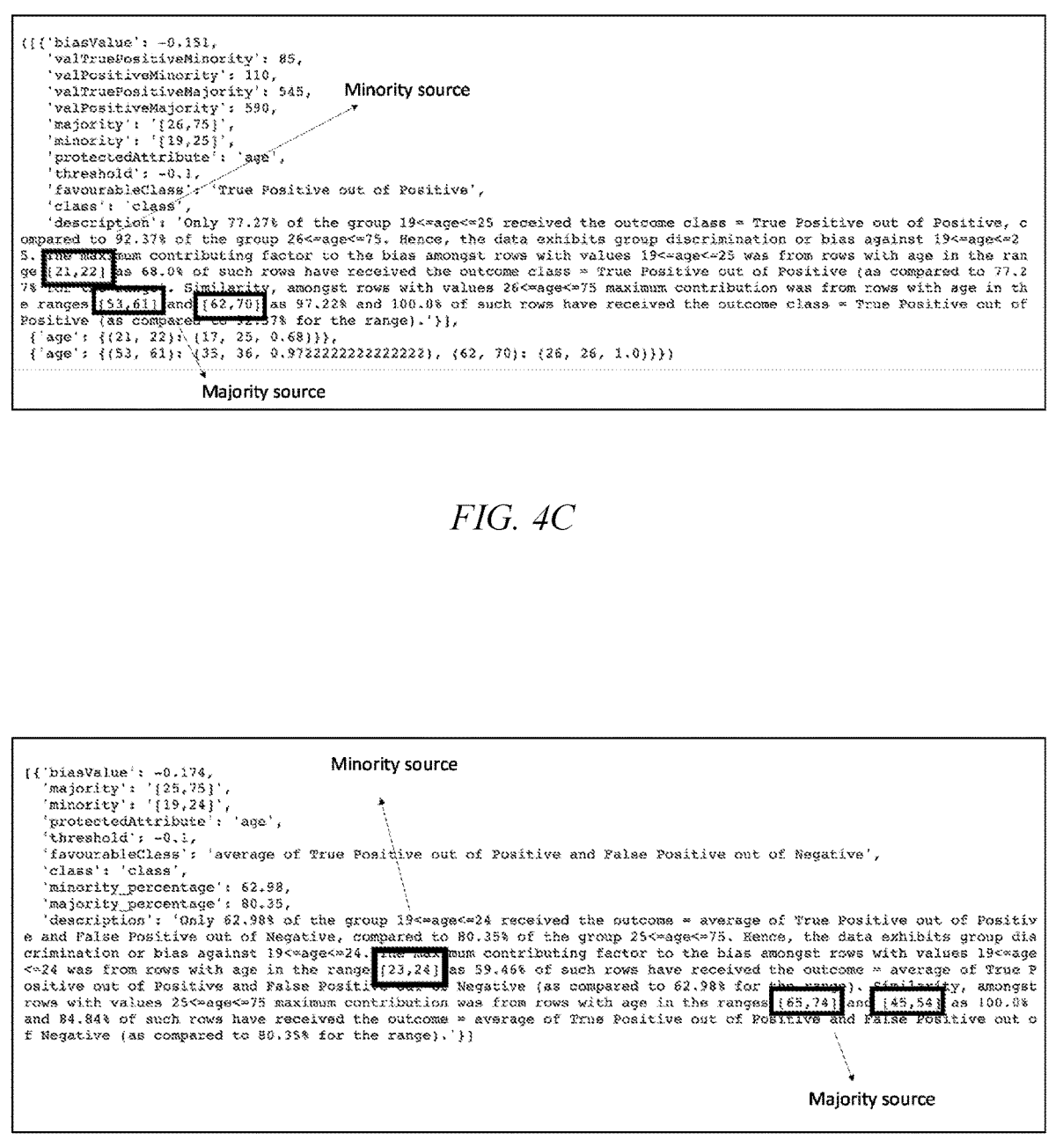

FIGS. 4A-4D are example diagrams of source of bias notifications for various example fairness metrics in accordance with one illustrative embodiment. FIG. 4A is an example source of bias notification for the disparate impact fairness metric. As shown in FIG. 4A, the source of bias notification comprises a first portion 410 that specifies the configuration parameters for identifying sources of bias which were provided in the original source of bias identification request, as well as additional values. It is assumed in these examples that the input data is in a tabular form having rows and columns, similar dataset 210 shown in FIG. 2, for example. A tabular format is not required, however, but using this tabular format as an example, the following are definitions of the values shown in the first portion 410 of the source of bias notification:

biasValue: Metric Value
valClassFavorTypeMinority: Row count with attribute=Minority and Class=Favourable,
valTypeMinority: Row count with attribute=Minority,
valClassFavorTypeMajority: Row count with attribute=Majority and Class=Favourable,
valTypeMajority: Row count with attribute=Majority,
majority: Majority value as specified by the user or detected by the Bias algorithm,
minority: Minority value as specified by the user or detected by the Bias algorithm,
protectedAttribute:Protected attribute as specified by the user,
favourableClass: 'Favourable class as specified by the user or detected by the Bias algorithm
class: Label Column Name,
description: Natural Language based detailed description of the result The source of bias notification also comprises a second portion 420 comprising a description indicating the reasoning for identifying bias as well as specifying the identified sources of bias and the reasoning for identifying them as a source of bias. It should be noted that the descriptions of sources of bias present in the second portion 420 provides a natural language explanation based on percentages of favorable results, however, the identification of the sub-groups is based on one or both of the fairness metric or explanation based mechanisms described previously. Thus, after having identified sources of bias using a fairness metric or explanation based evaluation, the natural language description is generated using the identified sources of bias but referencing their respective percentages of favorable results. In other illustrative embodiments, other descriptions may be generated that explicitly indicate the fairness metrics and/or results of explanation analysis performed to identify the sources of bias, if such descriptions are desirable for the particular implementation.

In the example depicted in FIG. 4A, bias is determined to be present because only 57.89% of the minority group [19, 25] for the protected attribute age, received an outcome class of "good" while 72.84% of the majority group [26, 75] received an outcome class of "good." The description then states that the maximum contributing factor to the bias against the minority group, i.e. rows of the input dataset corresponding to the age range [19, 25] is rows with age in the range [35, 43] and [44, 52], i.e. two sub-groups within the majority grouping. The description further states that the "good" outcome results for these sub-groups were 77.35% and 78.69%, respectively, which is higher than the "good" outcome percentage for the majority group as a whole (72.84%).

The source of bias notification further includes a third portion 430 that provides numeric values for the identified sources of bias where the first value is the ratio of valClassFavorTypeMajority to valClassFavorTypeMinority, the second value is the ratio of valTypeMajority to valTypeMinority, and the third value is the percentage of favorable results. For example, for the source of bias [035, 43], the ratio of valClassFavorTypeMajority to valClassFavorTypeMinority is 181, the ratio of valTypeMajority to valTypeMinority is 234, and the third value is the percentage of favorable results is 0.7735042.

FIG. 4B is an example source of bias notification for the statistical parity difference fairness metric. As can be seen in FIG. 4B, the source of bias notification is similar to that of FIG. 4A since the basis for both the statistical parity different fairness metric and the disparate impact fairness metric are the same. As a result, the same source of bias results are obtained.

FIG. 4C is an example source of bias notification for the equal opportunity difference fairness metric. The notification has similar portions as in FIG. 4A but with different values provided and a different description portion. In this case, the favorable class is true positive out of positive. The description provides a similar type of reasoning as in FIG. 4A for the detection of bias due to the differences in favorable outcomes for the majority and minority groupings, as well as an identifier of the maximum contributing factor for the bias. However, in this case, the maximum contributing factors are from both the minority grouping and the majority grouping. In this case, the sub-group comprising ages [21, 22] in the minority group [19, 25] exhibited a favorable outcome rate less than the minority group as a whole, i.e. 68% for the sub-group compared to 77.27% for the minority group as a whole. The sub-groups [53-61] and [62, 70] in the majority grouping [26, 75] exhibited a favorable outcome rate greater than the rate for the majority group as a whole, i.e. 97.22% and 100%, and thus, are also indicated as sources of bias in the dataset.

FIG. 4D is an example source of bias notification for the average odds difference fairness metric. FIG. 4D is similar in structure and description to the source of bias notification in FIG. 4C, but with different favorable classifications indicated and thus, different reasoning presented in the description for the finding of sources of bias within the minority and majority groupings. In this case, a source of bias in the minority grouping is identified as the age range [23, 24] and in the majority grouping as age ranges [65, 74] and [45, 54].

Source of bias notifications such as those shown in FIGS. 4A-4D may be transmitted as bias notifications 360 by the source of bias reporting engine 330 in FIG. 3 to an authorized computing system, such as administrator computing device 370. Moreover, such notifications may be logged or otherwise stored for later retrieval and use in evaluating the operation of the trained cognitive computing system 350 and/or trained computer model 352 as well as the input dataset 305. In response to receiving a source of bias notification 360, a user of the administrator computing device 370 may provide a request to the dataset bias engine 300 to perform de-biasing of the input dataset 305 and, optionally, a corrective operation on the trained cognitive computing system 350 and/or trained computer model 352, e.g., re-training of the trained computer model 352. In some illustrative embodiments, de-biasing and/or corrective actions may be requested with the original source of bias identification request 307 or may be performed automatically in response to identifying sources of bias within the input dataset 305 without waiting for a human user request to perform such de-biasing and/or corrective actions.

The de-biasing engine 340 is provided by the dataset bias engine 300 to surgically remove the sub-groups determined to be sources of bias in one or both of the majority and minority groups. That is, for those sub-groups identified as being sources of bias in the input dataset 305, the corresponding rows or entries in the input dataset 305 are removed from the input dataset 305 to generate a de-biased dataset 380 that comprises only those portions of the input dataset 305 that are determined to not be a source of bias. Thus, the de-biased dataset 380 still comprises rows or entries corresponding to the majority and minority groupings, with only those rows or entries corresponding to the sub-groups identified as sources of bias having been removed. In this way, a targeted and precise pruning of the input dataset 305 is performed.

The resulting de-biased dataset 380 may then be provided for performing a corrective operation with regard to the trained cognitive computing system 350 and/or computer model 352 that is trained on or operates on the dataset 380. For example, as shown in the depiction of FIG. 3, the de-biased dataset 380 may be provided as de-biased training data that is used by the machine learning engine 390 to train the computer model 352, e.g., neural network, deep learning network, ensemble learning system, or the like. In this way, the computer model 352 is retrained using de-biased training data, in which sources of bias have been minimized through the removal of sub-groups determined to be sources of bias, which will then remove or minimize the bias in the operation of the computer model 352 and the cognitive computing system 350 that operates based on the operation of the computer model 352.

In de-biasing the dataset 305, the de-biasing engine may perform evaluations on the dataset both before and after the de-biasing so as to determine a measure of bias drop in the de-biased dataset 380. In general, the bias drop is the difference of a bias metric of the original dataset 305 and the bias metric of the de-biased dataset 380, divided by the bias metric of the original dataset 305. The bias drop may be reporting to a requestor, such as a system administrator or the like, to demonstrate to the requestor the amount of bias reduction achieved through the source of bias identification and de-biasing of the dataset.

The described operation of the fairness metric bias source identifier 322 is performed primarily on the input dataset 305 directly with the bias detection tool 310 operating on the output of the trained cognitive computing system and/or trained computer model 352 to detect the presence of bias and the particular boundaries of the majority and minority groupings that are used by the fairness metric bias source identifier 322. It should be appreciated that in addition, or as a separate operation, the output of the trained cognitive computing system 350 and/or computer model 352 may also be evaluated, such as by the explanation based bias source identifier 324, which uses a model interpretability tool as a basis for determining sources of bias in the input dataset 305. The fairness metric bias source identifier 322 operation and the explanation based bias source identifier 324 operations may be performed together or separately in order to pinpoint or localize sources of bias in the input dataset 305 and use this identification as a basis for performing de-biasing operations on the dataset and potentially corrective operations on the trained cognitive computing system 350 and/or trained computer model 352.

Thus, in some illustrative embodiments, rather than, or in addition to, the operations of the fairness metric bias source identifier 322 as described above, after having detected bias using the bias detection tool 310 as noted previously, a model interpretability tool, such as Local Interpretable Model-agnostic Explanations (LIME) interpretability tool, for example, of the explanation based bias source identifier 324 may be used to generate an explanation for a classification generated by the trained cognitive computing system 350 and/or computer model 352 for a given portion of the input dataset 305. This explanation is then used as a basis for the identification of sources of bias by the explanation based bias source identifier 324.

That is, the explanation based bias source identifier 324 generates a majority grouping and minority grouping according to one or more protected attributes of interest in a manner similar to the embodiments previously described based on the results of the bias detection. For the minority grouping, for each entity in the minority grouping, the explanation based bias source identifier 324 provides corresponding input data to the trained cognitive computer system 350 and/or computer model 352 to thereby generate a classification result and the model interpretability tool operates on the trained cognitive computer system 350 and/or computer model 352 to generate an explanation output that identifies the top k features of the input data, i.e. the portion of the input dataset 305 that was processed to generate the classification output, i.e. which features of the input data were most influential in generating the classification output. The explanation based bias source identifier 324 analyzes the explanations relative to the protected attributes of interest to determine if the one or more of the protected attributes of interest appear in the top k features of the input data, e.g., k=3 results in the top 3 features of the input data being identified, where the features may correspond to attributes of the entity, e.g., age, ethnicity, gender, income level, or any other descriptive attribute of the entity. If so, then the explanation based bias source identifier 324 stores the corresponding matching protected attributes of interest and their corresponding values as flagged or identified sources of bias. This process may be performed for each entity in the minority grouping such that a set of matching protected attributes and corresponding values are generated. The values are aggregated to identify the sources of bias in the dataset with regard to disfavor for minority entities.

The same operations may be performed by the explanation based bias source identifier 324 for the majority grouping with favorable model predictions to thereby generate a second set of sources of bias in the dataset but with regard to bias in favor of the majority entities. The second set of sources of bias may be combined by the explanation based bias source identifier 324 with the first set of sources of bias to generate a final set of sources of bias in the dataset. The sources of bias are any entities in the majority or minority groupings that have the corresponding values of protected attributes specified in the final set of sources of bias. The final set of sources of bias may then be used by the de-biasing engine 340 to de-bias the input dataset 305 by removing samples (rows or entries) associated with the particular values of protected attributes specified in the final set of sources of bias. Again, a bias drop metric may be calculated to identify an amount of bias reduction due to the de-biasing of the dataset, which can then be reported to the administrator computing device 370 in one or more bias notifications 360.

In some illustrative embodiments, this final set of sources of bias generated by the explanation based bias source identifier 324 may also be combined with the sources of bias identified via the fairness metric bias source identifier 322 previously described above. Non-overlapping sources of bias may be identified by the SoBI tool 320 via the combination of the sets of sources of bias and used as a basis for de-biasing the dataset. As with the previously described embodiments, following de-biasing, the de-biased dataset may be used to reduce any bias in the operation of the trained cognitive computing system 350 and/or computer models 352 through a corrective action. For example, re-training of a trained cognitive computing system 350 and/or computer model 352 may be performed based on the de-biased dataset 380 rather than the original dataset 305 where bias was determined to be present.

Thus, again, the mechanisms of the illustrative embodiments provide an improved computing tool and computing tool operation for localizing sources of bias in a dataset based on detection of bias in the operation of a trained computing system or computing model. The mechanisms of the illustrative embodiments can isolate specific sub-groups of samples within the input dataset that are the source of bias in the operation of the trained computing system/computing models using a fairness metric evaluation and/or explanation based evaluation. The mechanisms of the illustrative embodiments may report such sources of bias as well as perform de-biasing of the dataset based on the identification of the sources of bias. Moreover, the mechanisms of the illustrative embodiments may perform corrective actions, such as re-training of the computer system/computer model using the de-biased dataset, so as to remove bias from the operation of the trained computing system/computing model.

Figure 5:
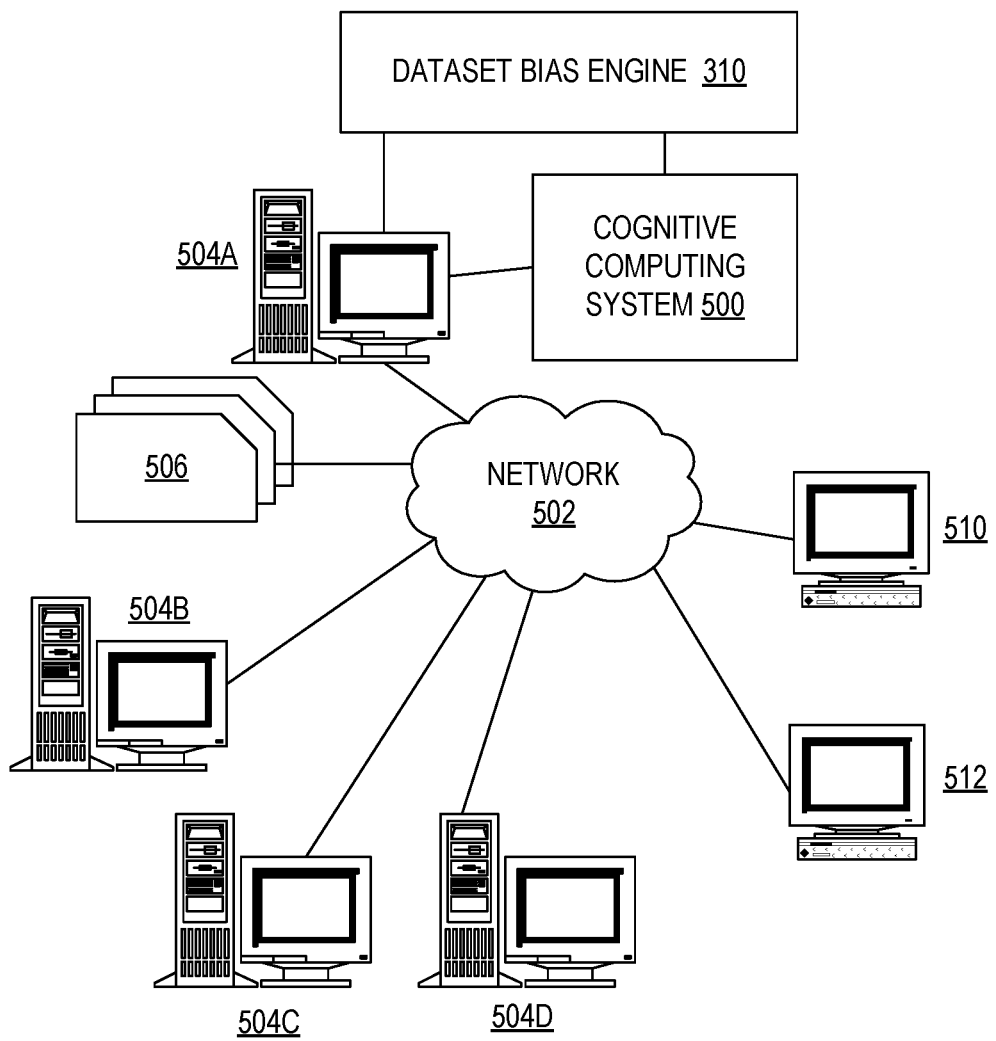
FIG. 5 is an example diagram of a distributed data processing system environment in which aspects of the illustrative embodiments may be implemented.

As the present invention is specifically directed to computer technology and specifically to an improved computing tool and computing tool operations for identifying sources of bias in datasets used by artificial intelligence computing systems and/or computing models, it is clear that the present invention may be implemented in various computing environments and with various types of data processing systems. FIG. 5 is an example block diagram of an example distributed data processing system environment in which aspects of the illustrative embodiments may be implemented.

As shown in FIG. 5, a cognitive computing system 500, which may employ one or more trained computer models, such as neural networks, deep learning networks, ensemble learning systems, and the like, is provided on one or more server computing devices 504A-D comprising one or more processors and one or more memories, and potentially any other computing device elements generally known in the art including buses, storage devices, communication interfaces, and the like, connected to the computer network 502. For purposes of illustration only, FIG. 5 depicts the cognitive system 500 being implemented on computing device 504A only, but as noted above the cognitive system 500 may be distributed across multiple computing devices, such as a plurality of computing devices 504A-D.

The network 502 includes multiple computing devices 504A-D, which may operate as server computing devices, and 510-512 which may operate as client computing devices, e.g., an administrator computing system such as 370 in FIG. 3, in communication with each other and with other devices or components via one or more wired and/or wireless data communication links, where each communication link comprises one or more of wires, routers, switches, transmitters, receivers, or the like. In some illustrative embodiments, the cognitive system 500 and network 502 enables question processing and answer generation (QA) functionality for one or more cognitive system users via their respective computing devices 510-512. In other embodiments, the cognitive system 500 and network 502 may provide other types of cognitive operations including, but not limited to, request processing and cognitive response generation which may take many different forms depending upon the desired implementation, e.g., cognitive information retrieval, training/instruction of users, cognitive evaluation of data, recommendation generation, data pattern analysis, or the like. Other embodiments of the cognitive system 500 may be used with components, systems, sub-systems, and/or devices other than those that are depicted herein.

The cognitive computing system 500 and/or computing models employed by the cognitive computing system 500, may be trained on and/or operate on one or more input datasets provided by one or more of the computing devices 504A-D, 510-512 or otherwise provided via a network attached storage 506 or other source of data accessible via the network 502. For example, a user of a computing device 510 may provide a computer model and corresponding training dataset to a computing model training and hosting service provided via server 504A which then trains the computing model based on the training dataset and deploys the trained computer model as part of the cognitive computing system 500 for use. Such an arrangement may be provided via a cloud based cognitive computing service, for example.

As shown in FIG. 5, in accordance with one illustrative embodiment, the dataset bias engine 310 of FIG. 3 may be implemented on one or more of the server computing devices 504A-D. The dataset bias engine 310 operates as previously described above to detect bias in the operation of the cognitive computing system, and then to identify the sources of the bias in the input dataset, as well as de-biasing and retraining of computer models and/or the cognitive computing system 500. While FIG. 5 shows the dataset bias engine 310 as being implemented on the same computing device 504A as the cognitive computing system 500, this is not a requirement and in fact they may be implemented on separate computing devices with accessibility by the dataset bias engine 310 to the cognitive computing system 500 and/or computing models employed by the cognitive computing system, as well as the input dataset being provided via the network 502.

Figure 6:
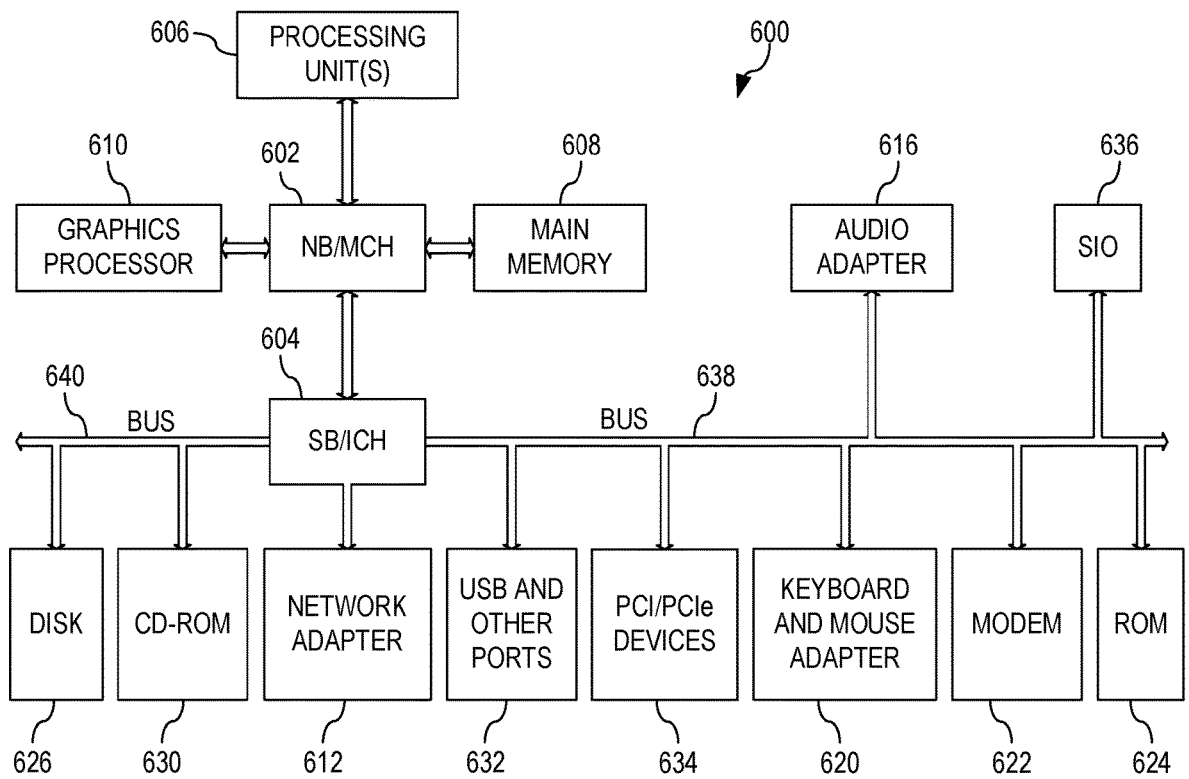
FIG. 6 is a block diagram of an example data processing system in which aspects of the illustrative embodiments are implemented.

FIG. 6 is an example block diagram of an example computing device in which aspects of the illustrative embodiments may be implemented. As shown in FIG. 6, in the depicted distributed data processing system, data processing system 600 is an example of a computer, such as server 504A or client 510 in FIG. 5, in which computer usable code or instructions implementing the processes for illustrative embodiments of the present invention are located. In one illustrative embodiment, FIG. 6 represents a server computing device, such as a server 504A, which implements a cognitive system 500 and/or the dataset bias engine 310. FIG. 6 is just an example of one type of computing system in which the cognitive computing system 500 and/or dataset bias engine 310 may be implemented and other architectures may also be utilized.

In the depicted example, data processing system 600 employs a hub architecture including north bridge and memory controller hub (NB/MCH) 602 and south bridge and input/output (I/O) controller hub (SB/ICH) 304. Processing unit 606, main memory 608, and graphics processor 610 are connected to NB/MCH 602. Graphics processor 610 is connected to NB/MCH 302 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 626 and CD-ROM drive 630 may use, for example, an integrated drive electronics (IDE) or serial advanced technology attachment (SATA) interface. Super I/O (SIO) device 636 is connected to SB/ICH 304.

An operating system runs on processing unit 606. The operating system coordinates and provides control of various components within the data processing system 600 in FIG. 6. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 600.

As a server, data processing system 600 may be, for example, an IBM® eServer™ System p® computer system, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as HDD 626, and are loaded into main memory 608 for execution by processing unit 606. The processes for illustrative embodiments of the present invention are performed by processing unit 606 using computer usable program code, which is located in a memory such as, for example, main memory 608, ROM 624, or in one or more peripheral devices 626 and 630, for example.

A bus system, such as bus 638 or bus 640 as shown in FIG. 6, is comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, includes one or more devices used to transmit and receive data. A memory may be, for example, main memory 608, ROM 624, or a cache such as found in NB/MCH 602 in FIG. 6.

Those of ordinary skill in the art will appreciate that the hardware depicted in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6. Also, the processes of the illustrative embodiments may be applied to a multiprocessor data processing system, other than the SMP system mentioned previously, without departing from the spirit and scope of the present invention.

Moreover, the data processing system 600 may take the form of any of a number of different data processing systems including client computing devices, server computing devices, a tablet computer, laptop computer, telephone or other communication device, a personal digital assistant (PDA), or the like. In some illustrative examples, data processing system 600 may be a portable computing device that is configured with flash memory to provide non-volatile memory for storing operating system files and/or user-generated data, for example. Essentially, data processing system 600 may be any known or later developed data processing system without architectural limitation.

Figure 7:
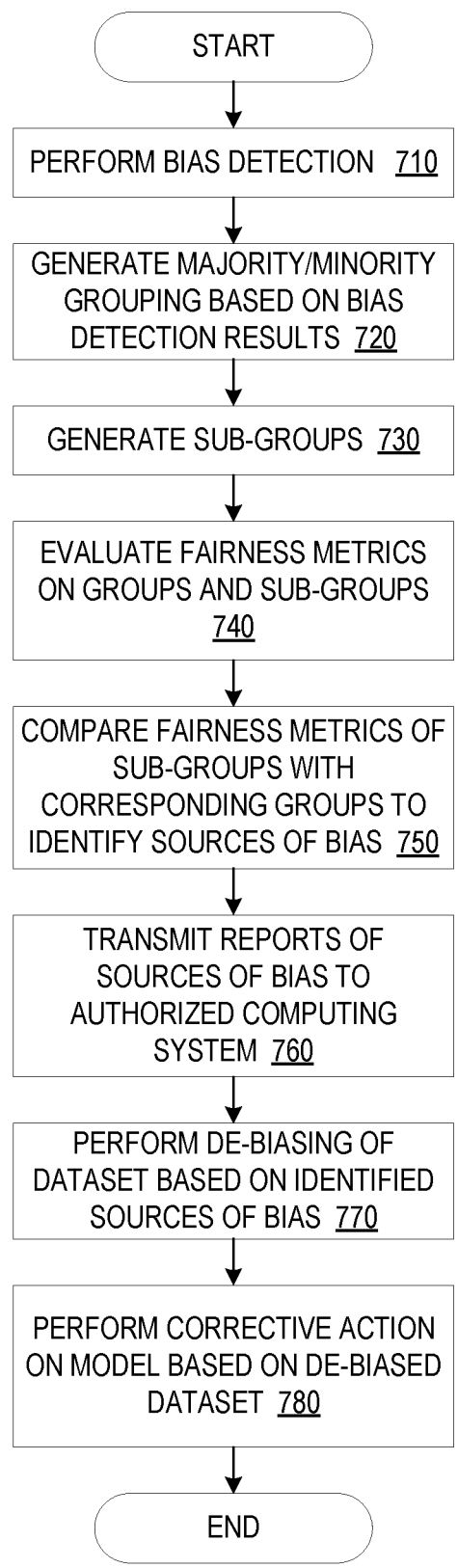
FIG. 7 is a flowchart outlining an example source of bias identification and de-biasing operation based on fairness metrics in accordance with one illustrative embodiment.

FIG. 7 is a flowchart outlining an example source of bias identification and de-biasing operation based on fairness metrics in accordance with one illustrative embodiment. As shown in FIG. 7, the operation starts by performing bias detection (step 710). It is assumed for purposes of the operation flow shown in FIG. 7 that bias is detected in the operation of a computer system or computer model based on an input dataset. However, it should be appreciated that if no bias is detected by the bias detection, the operation of FIG. 7 is not performed and the operation may go directly to "end".

Based on the results of the bias detection identifying bias in the operation of the computer system or computer model, the boundaries of the majority (privileged) and minority (non-privileged) groups are identified with regard to the protected attributes for which bias was detected, to thereby define majority and minority groupings based on the bias detection results (step 720). The majority and minority groupings are then sub-divided into a plurality of sub-groups (step 730). In one illustrative embodiment, for numerical attributes, the division is such that each sub-groups has the same size as each other sub-group within the same majority grouping or minority grouping (however the sizes may differ between the majority grouping sub-groups and the minority grouping sub-groups). For categorical attributes, the sub-groups corresponding to individual categories within the plurality of possible categories of the corresponding majority group or minority group.

One or more fairness metrics are then calculated for each of the majority and minority groups as a whole, and for each sub-group within the majority and minority groups (step 740). The fairness metrics calculated for the sub-groups are compared to the fairness metrics for the majority or minority group to which the sub-group belongs and sources of bias are flagged or otherwise identified based on these comparisons, e.g., in the majority grouping, sub-groups having fairness metrics that has a first predetermined relationship to the fairness metric of the majority grouping are flagged as sources of bias, and in the minority grouping, sub-groups having a fairness metric that has a second predetermined relationship to the fairness metric of the minority grouping are flagged as sources of bias (step 750), e.g., the first predetermined relationship may be an evaluation that fairness metric of a sub-groups is greater than the fairness metric for the majority grouping, or a predetermined amount greater, e.g., 5% or more greater than the fairness metric for the majority grouping, and the second predetermined relationship may be an evaluation that the fairness metric of the sub-groups is less than the fairness metric for the minority grouping, or a predetermined amount less, e.g., 5% or more less than the fairness metric for the minority grouping.

Having identified sources of bias, the operation then transmits reports and/or stores source of bias information indicating the identified sources of bias (step 760). Although not required, and in fact being optional, the operation may then perform de-biasing of the input dataset based on the identified sources of bias (step 770) and may perform a corrective action on the model based on the de-biased dataset, such as performing retraining of the model based on the de-biased dataset as a training dataset (step 780). The operation then terminates.

Figure 8:
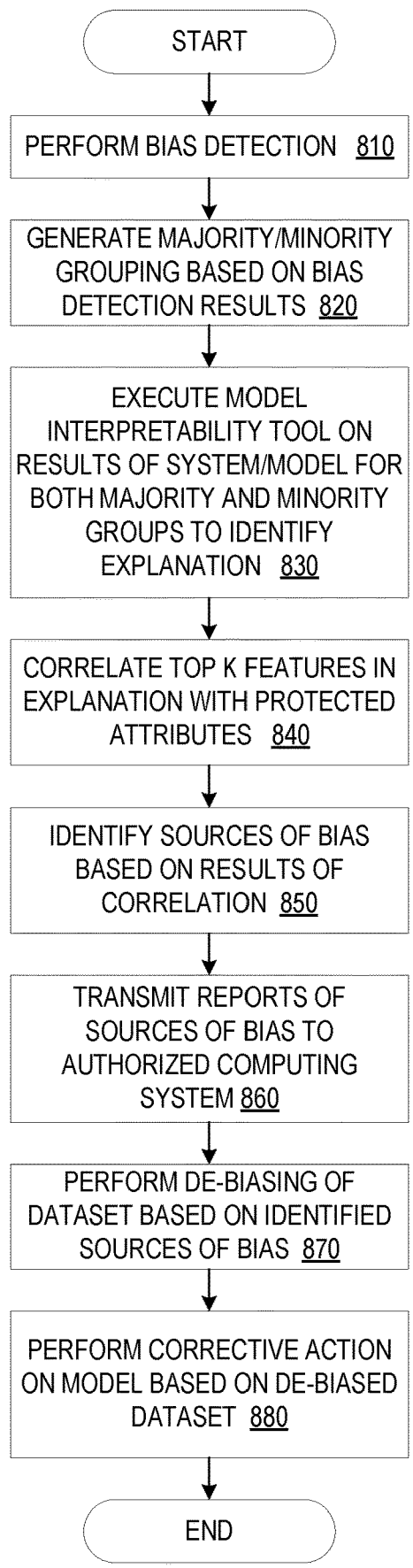
FIG. 8 is a flowchart outlining an example source of bias identification and de-biasing operation based on explanation analysis in accordance with one illustrative embodiment.

FIG. 8 is a flowchart outlining an example source of bias identification and de-biasing operation based on explanation analysis in accordance with one illustrative embodiment. As shown in FIG. 8, the operation starts by performing bias detection (step 810). Again, it is assumed for purposes of the operation flow shown in FIG. 8 that bias is detected in the operation of a computer system or computer model based on an input dataset. However, it should be appreciated that if no bias is detected by the bias detection, the operation of FIG. 8 is not performed and the operation may go directly to "end".

Based on the results of the bias detection identifying bias in the operation of the computer system or computer model, the boundaries of the majority (privileged) and minority (non-privileged) groups are identified with regard to the protected attributes for which bias was detected, to thereby define majority and minority groupings based on the bias detection results (step 820). A model interpretability tool, such as LIME for example, is executed on the results of the system/model for both the majority and minority groupings to thereby generate for each row or entry in the input dataset a corresponding explanation of the results generated by the system/model that identifies the key features influential in the results generated by the system/model (step 830).

The top K features identified in the explanations are correlated with the protected attributes of interest to determine if the protected attributes are present in the top K features (step 840). For those instances of protected attributes being present within the top K features, the corresponding values of these protected attributes in the explanations are extracted and stored as indicators of sources of bias (step 850).

Having identified sources of bias, the operation then transmits reports and/or stores source of bias information indicating the identified sources of bias (step 860). Although not required, and in fact being optional, the operation may then perform de-biasing of the input dataset based on the identified sources of bias (step 870) and may perform a corrective action on the model based on the de-biased dataset, such as performing retraining of the model based on the de-biased dataset as a training dataset (step 880). The operation then terminates.

It should be appreciated that while the above illustrative embodiments are described with regard to a cognitive computing system implementing or employing a question answering system and pipeline in which one or more computer models are utilized, the present invention is not limited to such. This is only one possible implementation of the mechanisms of the illustrative embodiment. The mechanisms of the illustrative embodiments may be utilized with any trained cognitive computing system and/or trained computer model in which the training may be biased due to the training process and/or the data upon which the training is performed, or due to the corpus of data used by the trained cognitive computing system and/or trained computer model to perform its cognitive computing operations. For example, in some illustrative embodiments, the cognitive computing system and/or computer model may run analysis of unstructured text in a batch manner, not in a question/answer form, for example.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and memory, the memory comprising instructions executed by the processor to cause the processor to implement a source of bias identification (SoBI) computing tool that identifies sources of bias in a dataset, the method comprising:
    executing, by a bias detection tool executing in the data processing system, a bias detection operation on results of an operation of a computer model, based on an input dataset, to generate a plurality of separate groupings of values for a protected attribute corresponding to a detected bias in the operation of the computer model;
    generating, by the SoBI computing tool, a plurality of sub-groups for each corresponding grouping of values, wherein each sub-group comprises an individual value, or a sub-range of values less than a total number of values in the corresponding grouping of values, for the protected attribute;
    analyzing, by the SoBI computing tool, each of the sub-groups in the plurality of sub-groups, based on at least one source of bias identification criterion, to identify one or more sources of bias in the input dataset, wherein each source of bias in the one or more sources of bias corresponds to a corresponding sub-group in the plurality of sub-groups; and
    outputting, by the SoBI computing tool, a bias notification to an authorized computing device specifying the one or more sources of bias in the input dataset.

2. The method of claim 1, wherein executing the bias detection operation to generate the plurality of separate groupings of values comprises:
    generating a majority grouping having a majority grouping range of values for the protected attribute, wherein the majority grouping corresponds to entries in the input dataset associated with a privileged set of entities identified via the bias detection operation; and
    generating a minority grouping having a minority grouping range of values for the protected attribute, wherein the minority grouping corresponds to entries in the input data set associated with a non-privileged set of entities identified via the bias detection operation, and wherein the plurality of sub-groups comprises a first set of sub-groups corresponding to the majority grouping and a second set of sub-groups corresponding to the minority grouping.

3. The method of claim 2, wherein values for the protected attribute are numerical values, and wherein at least one of the first set of sub-groups or second set of sub-groups is generated by dividing the corresponding majority grouping range of values or corresponding minority grouping range of values into a plurality of sub-ranges of a same size.

4. The method of claim 2, wherein values for the protected attribute are categorical values, and wherein at least one of the first set of sub-groups or second set of sub-groups is generated by dividing the corresponding majority grouping range of values or corresponding minority grouping range of values into individual category values.

5. The method of claim 1, wherein the bias identification criterion comprises at least one predetermined relationship between a first fairness metric calculated for a grouping of values of the protected attribute, and a second fairness metric calculated for a sub-group of the grouping of values of the protected attribute, and wherein the predetermined relationship is evaluated for each combination of grouping of values and corresponding sub-groups of the grouping of values.

6. The method of claim 5, wherein the at least one predetermined relationship comprises the second fairness metric being at least one of greater than the first fairness metric, or less than the first fairness metric, by a predetermined amount.

7. The method of claim 1, wherein the bias identification criterion comprises a correspondence between a predetermined number of features identified in an explanation generated by a model interpretability tool executed on the computer model, and the protected attribute.

8. The method of claim 1, further comprising:
    performing, by the SoBI computing tool, a de-biasing operation on the input dataset to thereby generate a de-biased dataset, wherein the de-biasing operation comprises removing entries in the input data set that correspond to the one or more sources of bias to thereby generate the de-biased dataset comprising entries in the input dataset that do not correspond to the one or more sources of bias.

9. The method of claim 8, further comprising:
executing, by the SoBI computing tool, a machine learning operation on the computer model to retrain the computer model using the de-biased dataset as a training dataset for the machine learning operation.

10. The method of claim 1, wherein the computer model is a machine learning computer model trained by a machine learning process based on the input dataset being a training dataset for the machine learning computer model.

11. A computer program product comprising a computer readable storage medium having a computer readable program stored therein, wherein the computer readable program, when executed on a computing device, causes the computing device to implement a source of bias identification (SoBI) computing tool that identifies sources of bias in a dataset, and to:
execute, by a bias detection tool executing in the data processing system, a bias detection operation on results of an operation of a computer model, based on an input dataset, to generate a plurality of separate groupings of values for a protected attribute corresponding to a detected bias in the operation of the computer model;
generate, by the SoBI computing tool, a plurality of sub-groups for each corresponding grouping of values, wherein each sub-group comprises an individual value, or a sub-range of values less than a total number of values in the corresponding grouping of values, for the protected attribute;
analyze, by the SoBI computing tool, each of the sub-groups in the plurality of sub-groups, based on at least one source of bias identification criterion, to identify one or more sources of bias in the input dataset, wherein each source of bias in the one or more sources of bias corresponds to a corresponding sub-group in the plurality of sub-groups; and
output, by the SoBI computing tool, a bias notification to an authorized computing device specifying the one or more sources of bias in the input dataset.

12. The computer program product of claim 11, wherein the computer readable program further causes the computing device to execute the bias detection operation to generate the plurality of separate groupings of values at least by:
generating a majority grouping having a majority grouping range of values for the protected attribute, wherein the majority grouping corresponds to entries in the input dataset associated with a privileged set of entities identified via the bias detection operation; and
generating a minority grouping having a minority grouping range of values for the protected attribute, wherein the minority grouping corresponds to entries in the input data set associated with a non-privileged set of entities identified via the bias detection operation, and wherein the plurality of sub-groups comprises a first set of sub-groups corresponding to the majority grouping and a second set of sub-groups corresponding to the minority grouping.

13. The computer program product of claim 12, wherein values for the protected attribute are numerical values, and wherein at least one of the first set of sub-groups or second set of sub-groups is generated by dividing the corresponding majority grouping range of values or corresponding minority grouping range of values into a plurality of sub-ranges of a same size.

14. The computer program product of claim 12, wherein values for the protected attribute are categorical values, and wherein at least one of the first set of sub-groups or second set of sub-groups is generated by dividing the corresponding majority grouping range of values or corresponding minority grouping range of values into individual category values.

15. The computer program product of claim 11, wherein the bias identification criterion comprises at least one predetermined relationship between a first fairness metric calculated for a grouping of values of the protected attribute, and a second fairness metric calculated for a sub-group of the grouping of values of the protected attribute, and wherein the predetermined relationship is evaluated for each combination of grouping of values and corresponding sub-groups of the grouping of values.

16. The computer program product of claim 15, wherein the at least one predetermined relationship comprises the second fairness metric being at least one of greater than the first fairness metric, or less than the first fairness metric, by a predetermined amount.

17. The computer program product of claim 11, wherein the bias identification criterion comprises a correspondence between a predetermined number of features identified in an explanation generated by a model interpretability tool executed on the computer model, and the protected attribute.

18. The computer program product of claim 11, wherein the computer readable program further causes the computing device to:
perform, by the SoBI computing tool, a de-biasing operation on the input dataset to thereby generate a de-biased dataset, wherein the de-biasing operation comprises removing entries in the input data set that correspond to the one or more sources of bias to thereby generate the de-biased dataset comprising entries in the input dataset that do not correspond to the one or more sources of bias.

19. The computer program product of claim 18, wherein the computer readable program further causes the computing device to:
execute, by the SoBI computing tool, a machine learning operation on the computer model to retrain the computer model using the de-biased dataset as a training dataset for the machine learning operation.

20. An apparatus comprising:
a processor; and
a memory coupled to the processor, wherein the memory comprises instructions which, when executed by the processor, cause the processor to implement a source of bias identification (SoBI) computing tool that identifies sources of bias in a dataset, and to:
execute, by a bias detection tool executing in the data processing system, a bias detection operation on results of an operation of a computer model, based on an input dataset, to generate a plurality of separate groupings of values for a protected attribute corresponding to a detected bias in the operation of the computer model;
generate, by the SoBI computing tool, a plurality of sub-groups for each corresponding grouping of values, wherein each sub-group comprises an individual value, or a sub-range of values less than a total number of values in the corresponding grouping of values, for the protected attribute;
analyze, by the SoBI computing tool, each of the sub-groups in the plurality of sub-groups, based on at least one source of bias identification criterion, to identify one or more sources of bias in the input dataset, wherein each source of bias in the one or more sources of bias corresponds to a corresponding sub-group in the plurality of sub-groups; and output, by the SoBI computing tool, a bias notification to an authorized computing device specifying the one or more sources of bias in the input dataset.

* * * * *